United States Patent [19]
Gallagher et al.

[11] Patent Number: 5,440,311
[45] Date of Patent: Aug. 8, 1995

[54] COMPLEMENTARY-SEQUENCE PULSE RADAR WITH MATCHED FILTERING AND DOPPLER TOLERANT SIDELOBE SUPPRESSION PRECEDING DOPPLER FILTERING

[75] Inventors: John J. Gallagher, Turnersville, N.J.; Harry Urkowitz, Philadelphia, Pa.

[73] Assignee: Martin Marietta Corporation, Moorestown, N.J.

[21] Appl. No.: 103,027

[22] Filed: Aug. 6, 1993

[51] Int. Cl.⁶ .................. G01S 13/28; G01S 13/42
[52] U.S. Cl. .................. 342/132; 342/136; 342/203; 342/162
[58] Field of Search ............ 342/131, 111, 196, 136, 342/140, 162, 195, 145, 146, 134, 116, 189, 201, 202, 203, 132, 109, 192

[56] References Cited
U.S. PATENT DOCUMENTS

5,151,702 9/1992 Urkowitz .................. 342/134

Primary Examiner—John B. Sotomayor
Attorney, Agent, or Firm—W. H. Meise; C. A. Nieves; S. A. Young

[57] ABSTRACT

A radar transmits dispersed pulses in which the subpulses are modulated by first and second mutually complementary code sequences, the autocorrelation functions of which are selected so that, in the sum of their autocorrelation functions, the main range lobes add, and the range sidelobes cancel. The received pulses with their Doppler sidebands are applied to a plurality of channels, each of which (except one) contains a mixer-oscillator combination that removes a specific Doppler phase shift along the range dimension at a different channel frequency. One channel has no mixer-oscillator because it is centered at a zero channel frequency. Within each channel, the received signals modulated by the first and second codes are matched-filtered by filters matched to the first and second codes, respectively, to produce first and second time-compressed pulses, each including (a) a main lobe representing the target range, and (b) undesirable range sidelobes. The first and second time compressed pulses are added together in each channel, to produce range pulses with suppressed range sidelobes. The channel signals, after pulse compression, delay, and addition, are each applied to one channel of a pulse-to-pulse Doppler filter bank. The outputs from the pulse-to-pulse Doppler filter bank are applied for further radar signal processing.

14 Claims, 14 Drawing Sheets

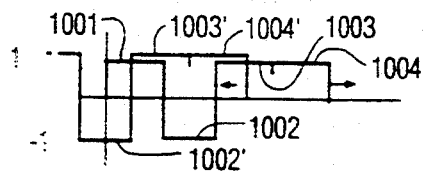
FIG. 12g
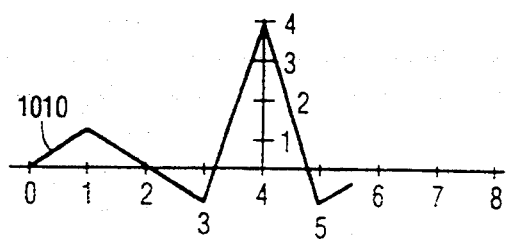
FIG. 12q
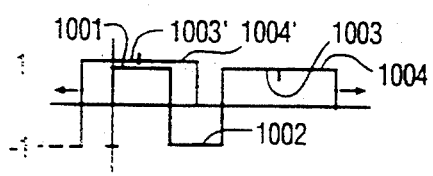
FIG. 12h
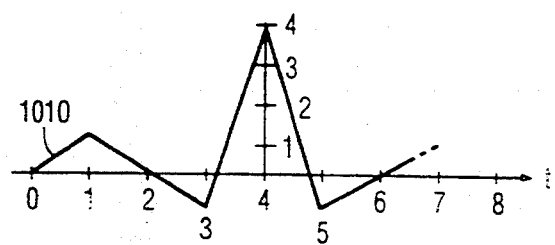
FIG. 12r
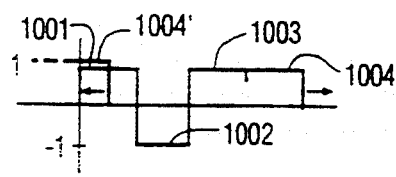
FIG. 12i
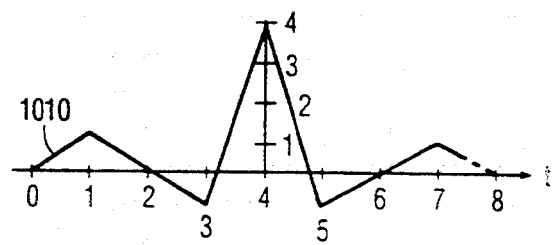
FIG. 12s
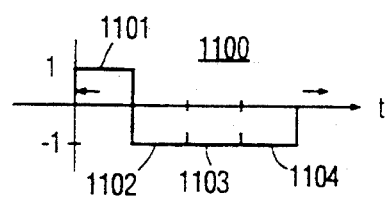
FIG. 13a
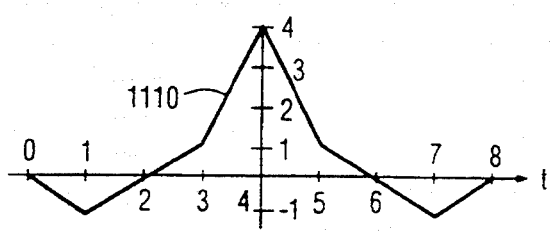
FIG. 13b
FIG. 14
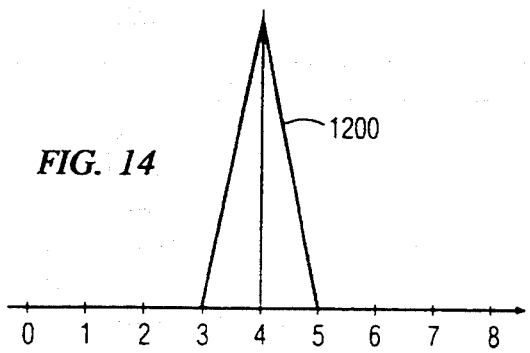

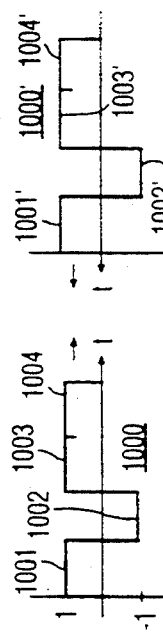
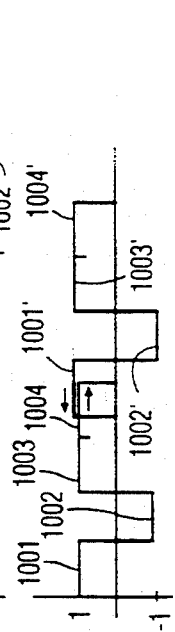
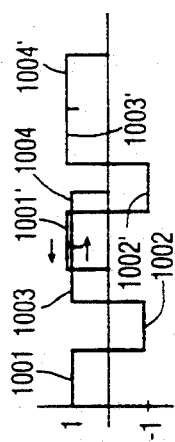
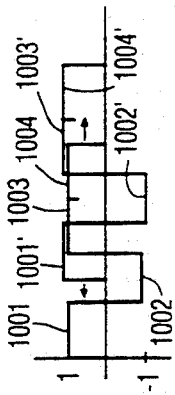
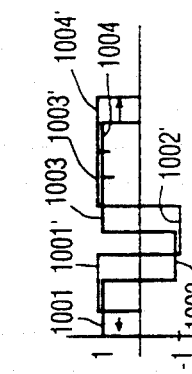
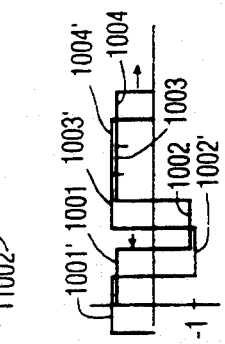
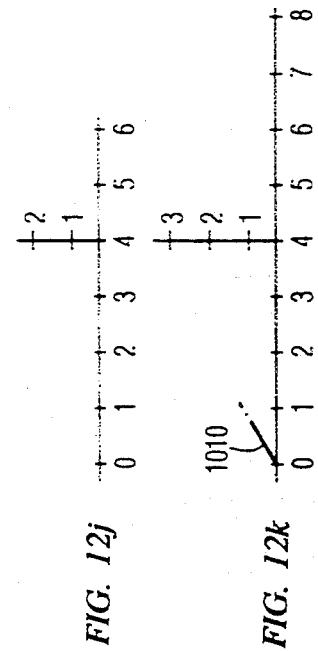
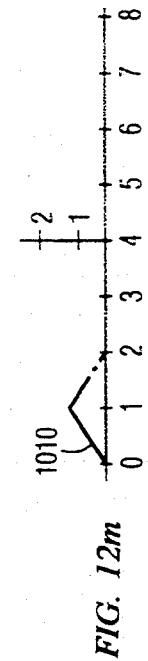
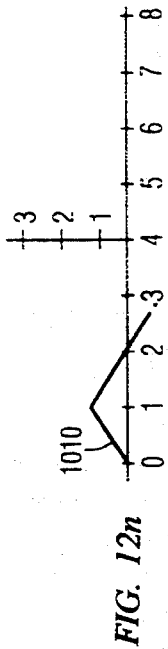
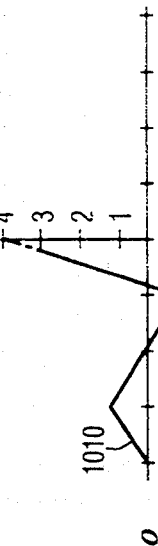
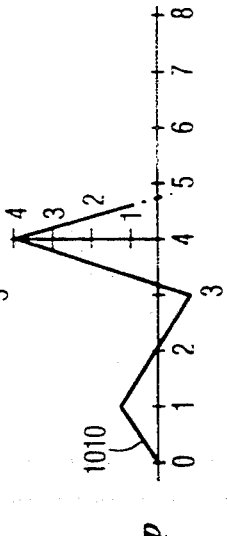
FIG. 12j
FIG. 12k
FIG. 12m
FIG. 12n
FIG. 12o
FIG. 12p
FIG. 12a
FIG. 12b
FIG. 12c
FIG. 12d
FIG. 12e
FIG. 12f

COMPLEMENTARY-SEQUENCE PULSE RADAR WITH MATCHED FILTERING AND DOPPLER TOLERANT SIDELOBE SUPPRESSION PRECEDING DOPPLER FILTERING This invention relates to radar systems generally, and more specifically to arrangements for reducing range sidelobes in radar systems transmitting mutually complementary codes, and using matched filtering of the codes, and summation for cancelling range sidelobes, followed by Doppler processing of received echoes.

The high speed and long range of modern airborne vehicles places increasing range demands on radar systems used for tracking. The long-range requirement also requires the use of relatively high transmitted power to reliably detect small targets. High transmitted power implies a relatively higher peak transmitter power or a longer duration transmitter pulse (also known as a "wider" pulse). Assuming a maximum available peak power, longer range implies a longer duration transmitted pulse. A longer duration pulse tends to reduce range resolution, which is the ability to distinguish among targets which are at similar ranges. Pulse compression techniques can be used to improve range resolution in spite of the longer pulse duration, thus eliminating the need for high peak power short pulses, but the minimum range at which a target can be detected by a monostatic radar system increases with the transmitted pulse length. Thus, if the transmitter pulse duration is 100 microseconds ($\mu$s), the minimum distance at which a target may be detected by a monostatic radar is about 8 nautical miles (nm). Clearly, a radar using pulses of such a duration cannot be used to detect close-in targets, as for example aircraft which are landing or taking off from an airport at which the radar is situated. An additional problem associated with pulse compression is the appearance of range sidelobes (as distinguished from antenna sidelobes) in addition to the main range lobe. The time position, or range, of the main lobe is the position that is tested for the presence of a target and for estimating the parameters of that target (reflected energy or power, closing speed, fluctuations in echo power and closing speed, etc.). The presence of range sidelobes on the compressed pulse results in interfering echoes which originate at ranges other than the range of the main lobe. This interference, known as "flooding," can cause erroneous estimates of the echo characteristics in the range cell (i.e., range increment) covered by the main lobe. Prior art techniques for suppressing range sidelobes include the "zero-Doppler" technique, in which the range sidelobe suppression scheme is based in part upon the assumption that the interfering echoes, as well as the desired echo, have a closing velocity that has no significant Doppler phase change or shift over the duration of the uncompressed pulse. The Doppler phase shift $\phi_{DV}$ across the uncompressed pulse is $2\pi$ times the product of the Doppler frequency shift and the uncompressed pulse duration (i.e. $\phi_{DV}=2\pi\ f_d T_0$ radians). When this Doppler phase shift is actually zero or very small, moderate sidelobe suppression is achievable with the zero Doppler design. However, the zero Doppler design is very sensitive to small Doppler frequency shifts, making deep sidelobe suppression impossible for radar applications in which very deep sidelobe suppression is desired, as for example in weather mapping, clear air turbulence detection, and microburst detection.

An approach to range sidelobe suppression elimination involves the use of complementary phase sequences imposed on the transmitted signal. U.S. Pat. No. 5,151,702, issued Sep. 29, 1992, in the name of Urkowitz (Urkowitz '702), incorporated herein by reference, describes a pulse radar system in which pairs of complementary phase sequences are transmitted sequentially, as illustrated in FIG. 2. FIG. 2 illustrates a sequence of transmitted pulses as described in the aforementioned Urkowitz '702 patent. In FIG. 2, the transmitted sequence includes a plurality M/2 of "A" pulses 1310 transmitted in sequence, switching over at a time T to a similar sequence of a like number M/2 of "B" pulses 1312, for a total of M pulses. The A and B pulses are mutually complementary, in that, after pulse compression by matched filtering, the sidelobes are equal but of opposite sign, while the main lobes are of the same sign and thus the sidelobes are cancelled while the main lobes add producing an enhanced main lobe with no sidelobes. An illustration is given below. Upon reception, Doppler processing is used to separate returns into frequency bins representative of radial speed. Each bin output undergoes pulse compression resulting in a pair of pulse compressed waveforms having mutually complementary (i.e., equal magnitude but opposite sign) sidelobes, but main lobes of the same sign and magnitude. Upon addition, after suitable delay, the main lobe is enhanced, but the sidelobes are cancelled. Mathematical support for the properties of complementary sequences and method for their generation are given in the references cited in the aforementioned Urkowitz '702 patent.

FIG. 1 is a simplified block diagram of a radar system as described in the abovementioned Urkowitz '702 patent. In FIG. 1, an antenna 18 is connected by way of a transmit-receive (T/R) duplexing or multiplexing system 50 to a transmit controller (TX) 3. Controller 3 establishes the system pulse duration, PRF, frequency and the like, and provides other control functions including generation of local oscillator and tuning signals. Antenna 18, controller 3 and T/R 50 together cause transmission of electromagnetic signals, illustrated as 7, and couple echoes of the electromagnetic signals received by antenna 18 by a path 9 to a receiver and analog signal processor (ASP) 52 for low-noise amplification, frequency downconversion, and the like, with the aid of local oscillator (L.O.) signals. In their broadest concept, these are conventional radar techniques. The resulting baseband signals may, in general, include orthogonal inphase (I) and quadrature (Q) components. The analog portion may also contain a subpulse matched filter, as is well-known in the art, to maximize the signal to noise ratio of each subpulse of the set of subpulses comprising each input sequence. Subpulse matched filters are known in the prior art and may be implemented, for example, by a surface acoustic wave (SAW) filter. The baseband signals are applied from receiver/ASP 52 to an analog-to-digital converter (ADC) associated with a block 62, which converts the analog baseband signals to digital form with the aid of system timing signals. The "range clock" portion of the timing signals establishes the smallest time interval into which the received signals are quantized, and therefore establishes the smallest discernible target range increment.

As described in the abovementioned Urkowitz patent, a buffer may be associated with ADC 62 of FIG. 1 for purposes unrelated to the present application. The digital signals are coupled from ADC 62 (or its buffers, if used) to a digital signal processor (DSP) 68. The signals processed by DSP 68 may be further processed in known manner, and ultimately are provided to a display for displaying information relating to the target.

FIG. 3 is a simplified block diagram of a portion of the processing which might be included in DSP block 68 of FIG. 1 for prior-art range sidelobe reduction using complementary sequences. In FIG. 3, an I+jQ signal from the complex analog-to-digital converter in block 62 is applied by way of an input port (input) 210 to a bank of narrow-band Doppler filters illustrated together as a filter bank 216. Each filter element of bank 216 responds to a particular narrow frequency band $f_0, f_1, f_2 \ldots f_{M-1}$, thereby separating the incoming signal into a plurality of frequency bins, the frequencies of which depend upon the Doppler frequency attributable to the radial velocity of the target. FIG. 11 illustrates a baseband spectrum $f_0$ and additional spectra $f_1, f_2, f_3 \ldots f_{M-1}$, which together represent the output signals from filter bank 216. An echo having a given Doppler shift produces a substantial output from only one filter output. For best velocity selectivity, the bandwidths of filter elements $f_0, f_1, f_2 \ldots f_{M-1}$, of filter bank 216 of FIG. 2 are narrow, in the range of a few Hertz or less. The bank of Doppler filters represented as block 216 may be implemented by a signal processor performing a discrete Fourier transform (DFT) by means of a fast Fourier transform (FFT) algorithm. The output of each filter is a range trace which is the sum of a sequence of Doppler filtered range traces. A particular filter output, therefore, represents target echoes having the particular Doppler frequency shift corresponding to its center frequency, and a small range of Doppler shifts about that center frequency, which depends upon the bandwidth of the filter. The output of each filter is coupled to a corresponding amplitude detector (not illustrated), to generate signals which, when arrayed, can be sorted according to the velocity of the target by selecting the appropriate detector output. Thus, the presence of a target signal at the output of a Doppler filter indicates that the target has a particular radial velocity. Within each Doppler frequency bin, the target range is known from the time of arrival of the signal. The signals produced by the abovementioned detectors are coupled to threshold circuits in DSP block 68 of FIG. 1, to allow separation of significant returns from noise, and thence for further processing. The circuits fed by the various Doppler filter elements $f_0, f_1, f_2, \ldots f_{M-1}$, may each be considered a "Doppler channel." Thus, filter element $f_0$ and detector 218a constitute a Doppler channel relating to targets with a low radial velocity, while filter element $f_2$ and detector 218b together constitute another Doppler channel relating to targets with a larger radial velocity, corresponding to $f_2$.

In the context of the Urkowitz '702 patent, DSP block 68 of FIG. 1 may perform the functions of (a) pulse-to-pulse Doppler filtering by means of a Fast Fourier Transform (FFT) algorithm, with data weighting to control signal leakage from neighboring Doppler shifts (frequency leakage); (b) digital pulse compression of the complex envelopes of the returns from the complementary sequences; (c) summing of such pulse compressed echo to eliminate or substantially reduce range sidelobe due to the complementary nature of the compressed sidelobes arising from the complementary code patterns associated with the pair of transmitted sequences; (d) further signal processing including CFAR (constant false alarm rate) processing, thresholding for target detection, spectral processing for weather mapping, etc. Items (a) and (d) are performed in ways well understood in the art, and form no part of the invention. The summing and consequent range sidelobe suppression (c) is advantageously Doppler tolerant as described below in the aforementioned Urkowitz '702 patent. The results of the processing done in block 68 may include (a) target detection reports (aircraft); (b) radar track detection reports; (c) weather components for each resolvable volume of space, including (c1) echo intensity; (c2) echo closing speed, and (c3) spectral spread of the echo, and these components of information may be included in Digitized Radar Detection Reports (DRDR). The DRDR reports may also include data relating to the signal processing. A person skilled in the art of pulse compression will know that the radar pulse must be coded in some manner that allows DSP block 68 to correlate received signals with the known transmitted pulse code. The correlation process simultaneously improves the signal-to-noise ratio and the range resolution of target echoes. A person skilled in the art knows that the pulse compression, delay, and subsequent summation of pulse compressed complementary sequences produces cancellation or substantial reduction of range sidelobes while enhancing the main lobe of the resultant compressed pulse. Prior to the aforementioned Urkowitz '702 patent, this could not be accomplished in a Doppler tolerant manner and therefore resulted in both sidelobe deterioration (i.e., increase in sidelobe level) and main lobe reduction in the presence of unknown Doppler shifts.

In accordance with an aspect of the aforementioned Urkowitz '702 patent range sidelobes are suppressed in a Doppler tolerant manner by a technique which includes separating the target echoes arising from both transmitted pulse sequences into a plurality of Doppler or frequency "bins" and then applying the removal of Doppler phase shift along the range dimension, sequentially pulse compressing the echoes from the two sequences, then delaying the earlier pulse compressed sequence and summing with the succeeding pulse compressed sequence.

SUMMARY OF THE INVENTION

In a radar system, first and second pulse sets are recurrently transmitted, either sequentially or simultaneously. The first set of pulses is dispersed in time pursuant to a first phase code, and the second set of pulses is dispersed in time pursuant to a second phase code which is complementary to the first. The echoes from the target are received to form received first and second pulse sets. The echoes may be processed by a plurality of multipliers, to each of which there is additionally coupled a digital oscillator of appropriate frequency to remove Doppler phase shift along the range dimension of the echo. Thereupon the echoes are processed by filtering matched to the separate code sequences, to thereby produce a pair of compressed range pulses in which the main range sidelobes are of the same polarity or phase, and in which the range sidelobes are of mutually opposite polarity or phase. The pair of compressed range pulses are summed to produce range pulses in which the sidelobes are suppressed. Following the process of range sidelobe suppression by summing the code-matched-filtered, pulse-to-pulse Doppler filtering is applied, to effect separation into frequency bins.

Thus, the code-matched compressed, summed received pulse sets are separated by frequency, and also by incremental time of receipt, which corresponds to range.

In a particular embodiment of the invention, the returned pulse sets are received sequentially. A first code-matched filter filters the first pulse set, and a switch is operated between the end of the first pulse sequence and before the beginning of the second pulse set, to decouple the first code-matched filter, and to couple in-line a second code-matched filter. The second code-matched filter then filters the second pulse set. A delay associated with the first code-matched filter delays the matched-filtered first pulse sequence until matched filtering of the second pulse set is accomplished, whereupon the delayed first set is summed with the second set. The plurality of such sums is applied to the several filters of pulse-to-pulse Doppler filter bank whose outputs are amplitude detected and applied to further processing as is usual in the radar art. In another embodiment of the invention, the returned pulse sets are received simultaneously.

DESCRIPTION OF THE DRAWINGS

FIGS. 12a–12i, collectively referred to as FIG. 12, are amplitude-time representations useful in explaining autocorrelation of the subpulses of a pulse which may be used in any of the systems of FIGS. 3, 4, 6, or 8;

FIGS. 12j–k and 12m–s are amplitude-time representations of the results of the autocorrelations of FIGS. 12a–12i, respectively;

FIG. 13a illustrates a pulse set which is complementary to the pulse set of FIG. 12, and FIG. 13b illustrates the result of its autocorrelation;

FIG. 14 represents the summing of the autocorrelated waveforms of FIGS. 12 and 13a;

DESCRIPTION OF THE INVENTION

Figure 1:
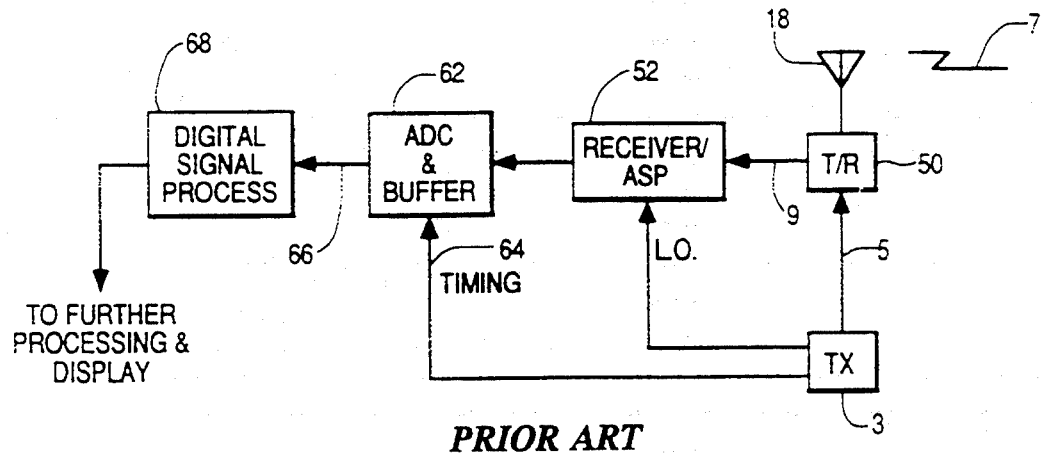
FIG. 1 is a simplified block diagram of a radar system as described in the abovementioned Urkowitz '702 patent.
Figure 3:
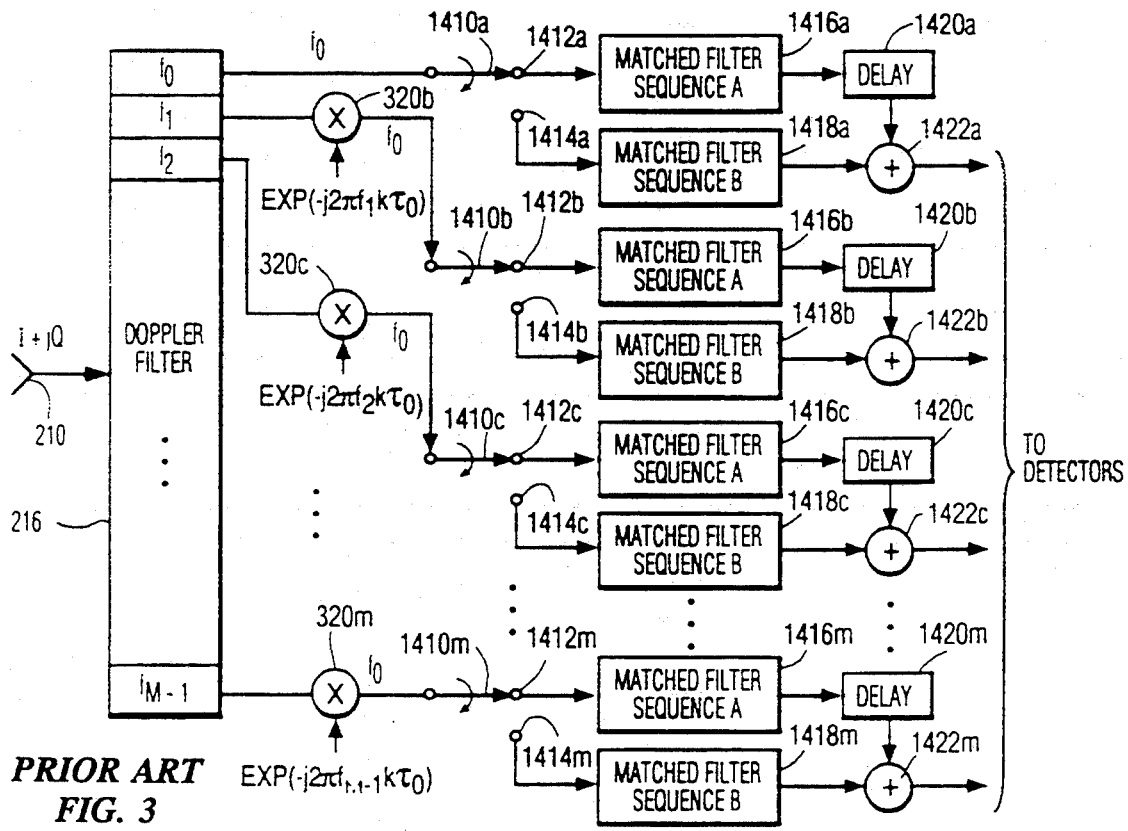
FIG. 3 is a simplified block diagram of a portion of the prior art processing, as described in the aforementioned Urkowitz '702 patent.
Figure 4:
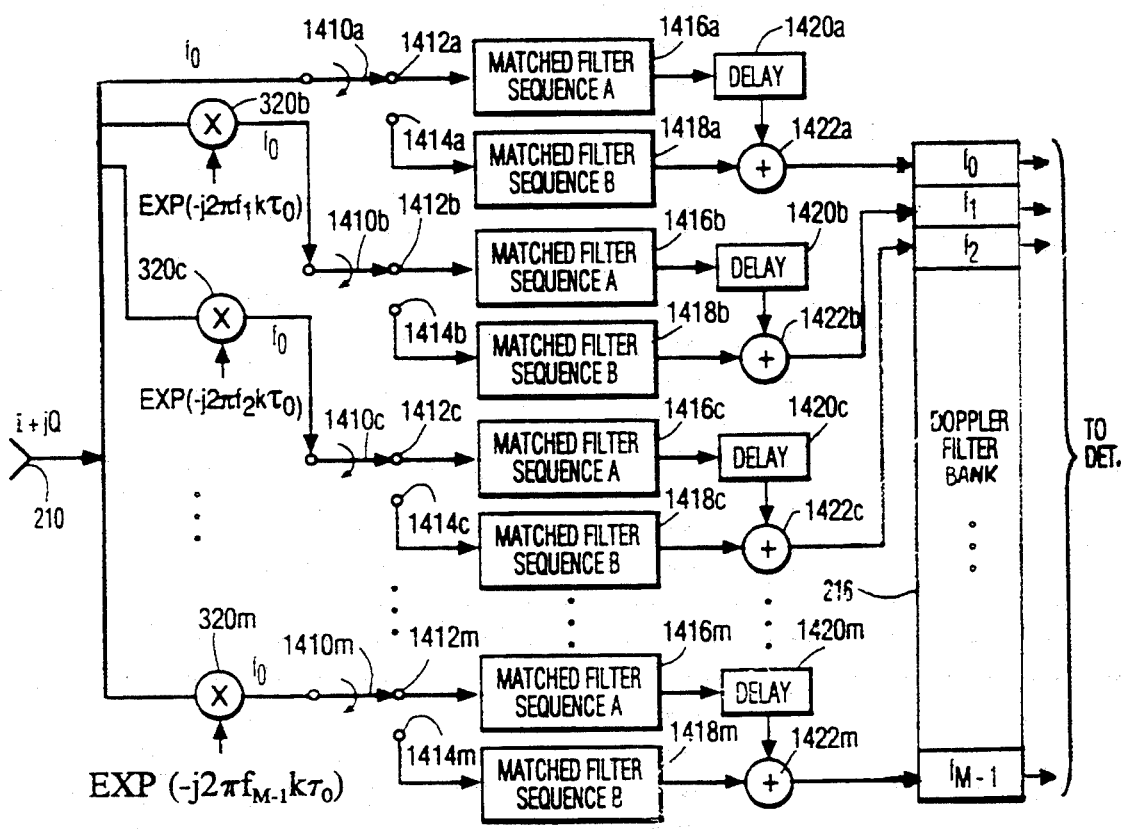
FIG. 4 is a simplified block diagram of a sequential-transmission, complementary code, signal receiving arrangement according to the invention, in which the signals are sequentially switched between different code matched filters.

The invention pertains specifically to the reception of returns including the aforementioned pairs of complementary phase sequences, and to processing using matched filtering (i.e., pulse compression) and sidelobe cancellation. Elements of FIG. 4 corresponding to those of FIG. 3 are designated by the same reference numerals. FIG. 4 is similar to FIG. 3, differing in that the frequency conversions and matched filtering precede, rather than follow, Doppler filter 216. An aspect of the present invention recognizes that the pulse to pulse Doppler filtering and consequent removal of Doppler phase shift in the range dimension, pulse compression, delay, and summation are independent operations. This independence arises from the fact that removal of Doppler phase shift in range, pulse compression, delay, and summation are intra-pulse operations while the Doppler filtering is an interpulse (i.e., pulse to pulse) operation. Therefore, these operations may be reversed. The alternative set of operations is a central feature of the present invention and is illustrated in FIG. 4. A mathematical demonstration that FIG. 4 is equivalent to FIG. 3 appears in the below Appendix.

The processor of FIG. 4 couples the signal applied to input port (input) 210 to a plurality of digital mixers or multipliers (i.e., digital mixers) 320b, 320c, ..., 320m. The unmixed I+jQ signal applied to input port 210 is applied directly, without mixing, to the movable or common element of switch 1410a, which is associated with contacts 1412a and 1414a. Thus, one of the plurality of outputs from (or connections to) input port 210 is a direct connection to switch 1410a. This direct connection exists because this path represents the zero Doppler frequency. Similarly, the outputs of multipliers 320b, ..., 320m are connected to the common elements of corresponding switches 1410b, ..., 1410m, respectively. For example, one connection from signal input port 210 is to the input port of multiplier 320b. Multiplier 320b has a second input port coupled to a digital oscillation source (not illustrated in FIG. 4) of signal $$\exp(-j2\pi f_{ik}\tau_o), \quad k=0, 1, \ldots \qquad (1)$$

where $f_1$ is the center frequency of the corresponding filter of filter bank 216 that is ultimately coupled to the output of multiplier 320*b*, $\tau_0$ is the range sampling period, and k is an integer time index. The oscillator frequency represented by equation (1) in the arrangement of FIG. 4 is thus the negative (i.e., same absolute value, but 180° out of phase) of the center frequency ($f_1$) at which the corresponding filter element of filter bank 216 is centered. As a further example, the oscillator exp $(-j2\pi f_2 k\tau_0)$ applied to multiplier 320*c* is negative of frequency $f_2$ at which filter element $f_2$ of filter bank 216 is centered. Similarly, oscillator exp $(-j2\pi f_M k\tau_0)$ applied to multiplier 320*m* is the negative of frequency $f_M$ at which filter element $f_{M-1}$ of filter bank 216 is centered. No multiplier 320 is necessary to process that portion of the signal applied to input port 210 which is coupled to switch element 1410*a*, because the signal is already centered at frequency $f_0$ to which filter element $f_0$ of filter bank 216 is tuned. Any initial phase shift associated with the oscillator signal is unimportant, because eventually only the magnitudes of the Doppler channel signals are used. Essentially, the outputs of the individual multipliers have been heterodyned in range so that the Doppler phase shift along the range dimension has been removed so that the Doppler phase shift in each multiplier output has been confined to a narrow interval around zero frequency, labeled $f_0$, as far as Doppler frequency phase variation in the range dimension is concerned, leaving only the pulse-to-pulse Doppler frequency phase shift. This latter Doppler phase shift will ultimately be removed in the Doppler filter bank 216.

Figure 2:
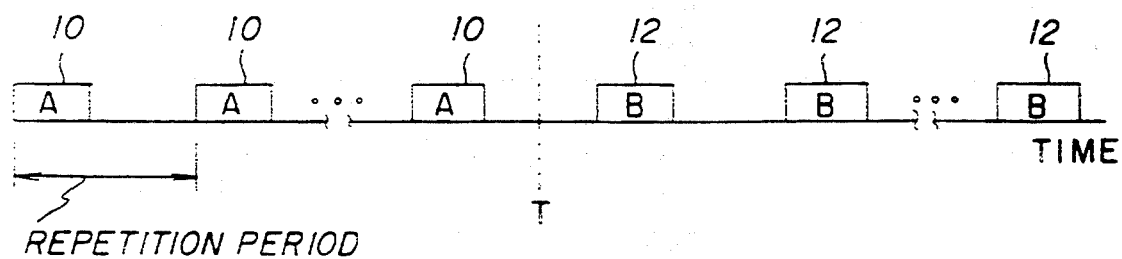
FIG. 2 illustrates a sequence of pulses as described in the aforementioned Urkowitz '702 patent.

Since the Doppler phase shift along the range dimension has been removed at the outputs of multipliers 320*b*, 320*c*, . . . , 320*m* of FIG. 4, as well as on the path leading to single pole, double throw switch 1410*a*, any filtering in the range dimension can be identical for all such paths. The common elements of switches 1410 are ganged or coupled together so that all the movable portions switch to contact their respective contacts 1414 simultaneously. The input to each of the switches 1410*a*, 1410*b*, . . . , 1410*m* consists of the two sets of signals, sequential in time, as illustrated in FIG. 2. Each set is a set of M/2 subpulses comprising one transmitted pulse. The first sequence of subpulses is modulated with phase sequence A, while the second sequence of subpulses is modulated with phase sequence B, complementary to phase sequence A. Complementary sequences are described below.

In a manner similar to that of FIG. 3 and as described in the Urkowitz '702 patent each contact 1412 of FIG. 4 is connected to the input of a matched filter 1416 which is matched to subpulse sequence A of FIG. 2. Thus, contact 1412*a* of FIG. 4 is connected to the input of matched filter 1416*a*. Similarly, switch contact 1412*b* is coupled to the input of a matched filter 1416*b* which is matched to the same A sequence. Similarly, contact 1412*m* is coupled to the input of matched filter 1416*m* which is matched to subpulse sequence A. Each of the single pole, double throw switches 1410*a*, . . . , 1410*m* of FIG. 4 is illustrated as a mechanical switch which includes contacts 1412 and 1414, but those skilled in the art know that mechanical switches are not used, and that solid state transmission switches suitable for the number of parallel bits in each data path are used instead.

Each terminal 1414 of switches 1410 of FIG. 4 is coupled to a corresponding filter 1418, which is matched to subpulse sequence B of FIG. 2. For example, switch contact 1414*a* is coupled to the input of a matched filter 1418*a*, which is matched to subpulse sequence B of FIG. 2. Similarly, switch contact 1414*c* of FIG. 4 is coupled to the input of filter 1418*c* which is also matched to subpulse sequence B of FIG. 2. The position of movable elements 1410 determine whether the baseband signals derived from the multipliers as well as directly, or in an unmultiplied manner, from input port 210, are applied to filters matched to the A or B sequences. In the illustrated position of movable switch elements 1410, the A-matched filters are connected.

The output signals from A matched filters 1416 of FIG. 4 are coupled to corresponding delay elements 1420. For example, the output of matched filter 1416*b* is coupled to the input of a delay element 1420*b*, and the output of a matched filter 1416*m* is coupled to the input of a delay element 1420*m*. Each A filtered signal is applied from its filter 1416 to a delay 1420, which delays for a duration, MT/2, where T is the pulse repetition period. The delay of MT/2 is equal to the duration of the A pulse sequence or M/2 pulses. The outputs of delay elements 1420 are applied to inputs of a corresponding set of adders (+) or summers 1422, which also receive the outputs of the associated B matched filters 1418. Thus, the output of A matched filter 1416*a* is applied to a first input port of an adder 1422*a* by way of a delay 1420*a*, and the output of B matched filter 1418*a* is coupled to a second input port of adder 1422*a*. Similarly, the output of A matched filter 1416*c* is applied to a first input port of an adder 1422*c* by way of a delay 1420*c*, and the output of B matched filter 1418*c* is coupled to a second input port of adder 1422*c*.

The A matched filters 1416 of FIG. 4 respond to the sequence of A pulses, if present, by producing progressively greater response peaks as the filters "fill" with matched signal. At the moment when each A matched filter 1416 is "full", the filter output is a maximum. Thus, the A matched filter produces a time-compressed filtered signal representing, by its time of receipt, the target range, and representing, by its deviation from a particular Doppler frequency band, the radial speed of the target. The A filtered signal undesirably includes a plurality of sidelobes.

The time at which the switches 1410 switch from the A to the B filters in the arrangement of FIG. 4 may be any time during transmission of the first pulse following the initial group of M/2 pulses, and during the first pulse of each set of M/2 pulses thereafter. During transmission of the pulse, nothing can be received anyway, so any time during the pulse is satisfactory.

In the alternate positions (not illustrated) of switches 1410 of FIG. 4, the baseband signals in each Doppler channel are each applied to a B matched filter 1418. The B sequence (if present) "fills" the B sequence matched filter for that channel, and the filter response increases toward a maximum value, which occurs when the B matched filter is "full." Thereafter, the response of the B matched filter decreases. The outputs of the B matched filters are applied to the corresponding adders 1422, with the peak B response arriving at the adder at the same time as the peak A response from the associated delay element 1420. The peak responses are in-phase and of the same polarity, and they add to produce the main range lobe; but the sidelobes produced by the A and B sequences are of mutually opposite polarity, and tend to cancel in each adder, as described in greater detail below. Thus, the range sidelobes are reduced by mutual cancellation when complementary pulse sequences are transmitted, without the use of separate range sidelobe reduction filters.

As described above, the range sidelobes tend to cancel. If the input Doppler shift is not exactly equal to the center frequency of a Doppler filter element of filter bank 216, the range sidelobes may not cancel exactly, but the deterioration in the cancellation will not exceed that caused by a frequency shift equal to half the bandwidth of a filter element. Normally, this equals half the frequency spacing between adjacent filters of the filter bank.

The pulse-compressed, sidelobe suppressed baseband information at the output of each summer 1422 of FIG. 4 is applied to a corresponding filter of Doppler filter bank 216 of FIG. 4. For example, the output of summer 1422a is applied to filter element $f_0$ of Doppler filter bank 216, the output of summer 1422b is applied to filter element $f_1$ of Doppler filter bank 216, ... and the output of summer 1422m is applied to filter element $f_{M-1}$ of Doppler filter bank 216. This arrangement has the salient advantage that the Doppler filter elements of filter bank 216 are identical, being all at baseband. A further operational advantage is that the effective Doppler center frequencies of the system may be selected simply by selecting the frequency of mixer signals applied to multipliers 320; the oscillator frequency corresponds to the center Doppler frequency of that particular channel.

In operation of the arrangement of FIG. 4, the complex received signal is applied to the common element of switch 1410a and, by way of frequency-converting multipliers 320b, 320c, ... 320m to the corresponding common elements of switches 1410b, 1410c, ... 1410m, respectively. This effectively converts the Doppler frequency of interest to baseband, so that the following matched filters 1416a–1416m are mutually identical, matched filters 1418a–1418m are mutually identical, and the Doppler filters of Doppler filter bank 216 are mutually identical, for cost reduction.

Figure 5:
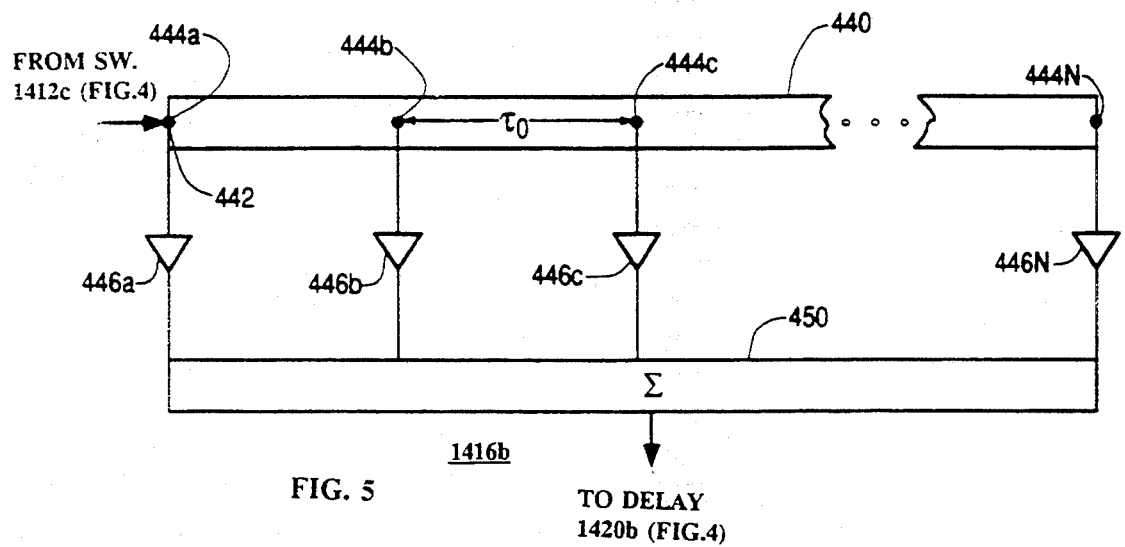
FIG. 5 is a simplified block diagram of a pulse compression (matched) filtering portion of the arrangement of FIG. 4.

FIG. 5 illustrates a tapped delay line or transversal filter of the type known as a "finite impulse response" (FIR) filter, because a change in the input causes a change in the output that extends over a finite time. Such a filter may be used as a matched filter signal processor 1416 or as a matched filter signal processor 1418 in FIG. 4. For definiteness, FIG. 5 represents matched filter (i.e., pulse compressor) 1416b for sequence A. Downconverted signals from multiplier 320b are applied via terminal 1412b of switch 1410b of FIG. 4 to an input port 444a of the filter of FIG. 5. Port 444a of FIG. 5 applies the signal to a tapped structure 440 which may be a delay line (analog) or shift register (digital) coupled as a transversal filter, and allowing signals to propagate to the right. Signals propagate past taps illustrated as nodes 444b, 444c, ..., 444N. The temporal spacing (delay) between taps equals the range sampling period $\tau_0$. Each node 444 is coupled to a tap weight multiplier, illustrated by a triangular symbol 446a, 446b, ... 446n, which weights the signals applied thereto. The weighted, delayed signals from multipliers 446 are applied to a combinatorial summer ($\Sigma$) 450 for summing all the weighted signals for producing the desired matched filtered signals. The summed signals are applied from the output of summer 450 of FIG. 5 to delay element 1420b of FIG. 4. The number of taps and the weights to be applied are determined by the pattern of subpulses making up sequence A. the weights are, in fact, the conjugate, time reverse, of the complex envelope values of the A sequence pulse sampled at a sampling frequency $1/\tau_0$.

An arrangement like that of FIG. 5, but with taps weights matched to the complex envelope samples of sequence B, may be used as matched filter 1418b of FIG. 4 for sequence B. The output of sequence B matched filter 1418b of FIG. 5 is applied to adder 1422b, and the sum is formed therein with the delayed (through delay 1422b) output of sequence A matched filter 1416b. The sum formed in summer 1422b is applied to filter $f_1$ of the pulse to pulse Doppler filter bank 216. The outputs of Doppler filter bank 216 are coupled for further processing to amplitude detectors, as described previously, for sorting and further processing. The operation described explicitly for matched filters 1416b, 1418b, delay 1420b, and summer 1422b also applies to the corresponding other matched filters, delays and summers.

Figure 6:
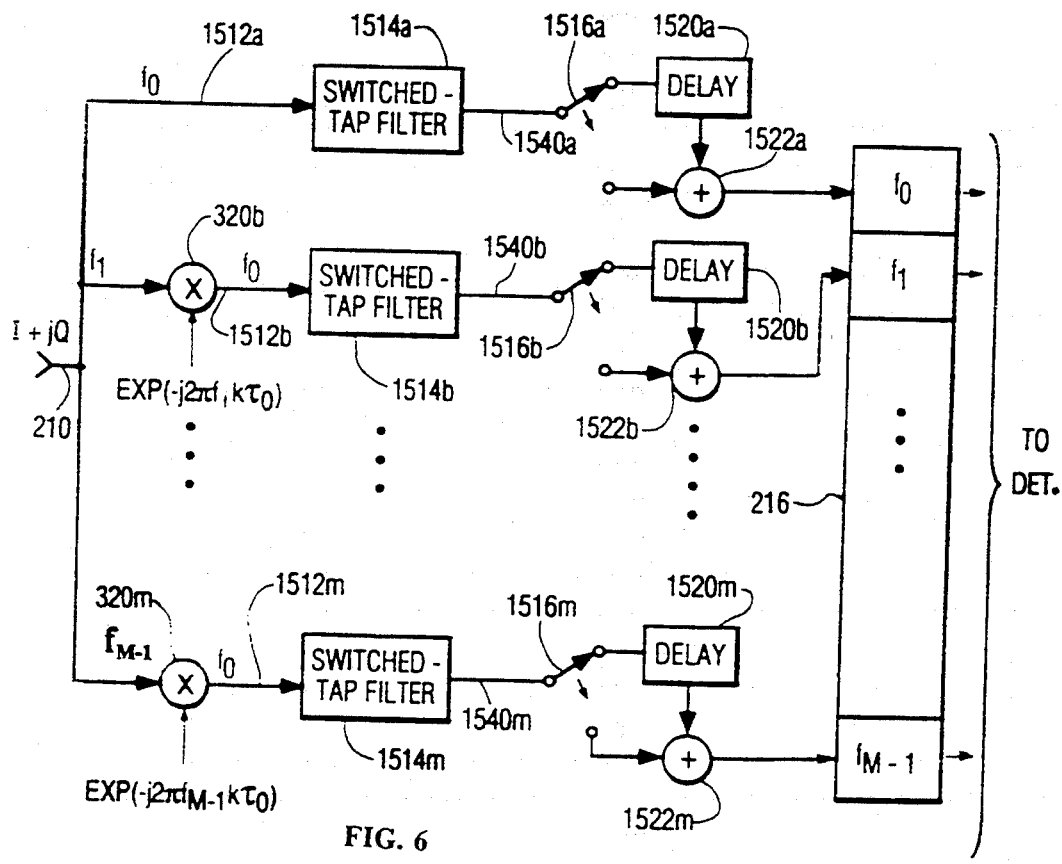
FIG. 6 is a simplified block diagram of another signal processor, for performing matched filtering of first and second complementary pulse sets.

FIG. 6 is a simplified block diagram of another arrangement for performing matched filtering of complementary pulse sequences in accordance with the invention. Elements of FIG. 6 corresponding to those of FIG. 4 are designated by like reference numerals. In FIG. 6, the baseband ($f_0$) signals in each Doppler channel are applied to switched-tap transversal filters 1514. For example, the baseband signal from multiplier 320b in the $f_1$ Doppler channel is applied by way of a data path 1512b to a switched-tap transversal filter 1514b, and the baseband signal from multiplier 320m in the $f_{M-1}$ Doppler channels is applied to a similar filter 1514m. The $f_0$ Doppler channel, already being at baseband, does not require a multiplier 320.

Figure 7:
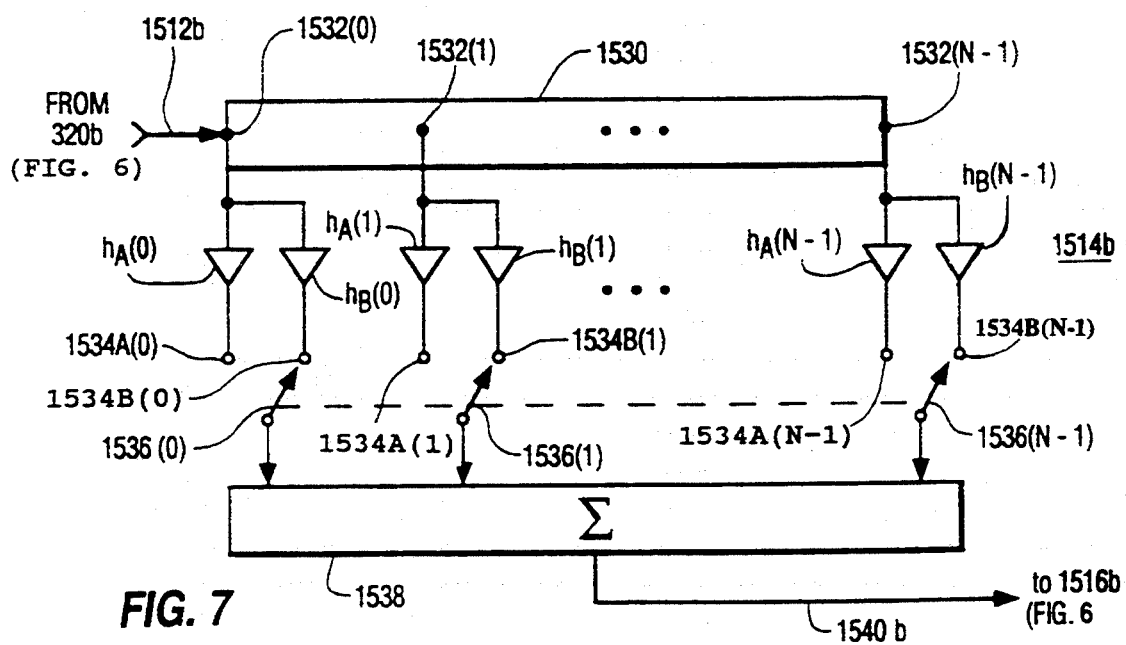
FIG. 7 is a simplified block diagram of a structure useful in performing matched filtering with differing weights in the arrangement of FIG. 6.

FIG. 7 illustrates a representative switched-tap transversal filter 1514. For definiteness, FIG. 7 represents filter 1514b of FIG. 6. In FIG. 7, the baseband signals are received on data path 1512b and are applied to a delay line or shift register 1530, which propagates the signal to the right, past a plurality of taps 1532(0), 1532(1) ... 1532(N−1). Each tap is coupled to the inputs of a pair of weighting elements $h_A$ and $h_B$. For example, tap 1532(0) is coupled to the inputs of a pair of weighting elements $h_A(0)$ and $h_B(0)$, tap 1532(1) is coupled to the inputs of a pair of weighting elements $h_A(1)$ and $h_B(1)$, and other taps (not illustrated) are coupled to corresponding pairs of weighting elements. Last tap 1532(N−1) is coupled to the inputs of a pair of weighting elements $h_A(N-1)$ and $h_B(N-1)$.

The output of each weighting element $h_A$ of FIG. 7 is coupled to a first contact 1534A of a single pole, double throw switch illustrated as a movable mechanical element 1536. The output of each $h_B$ weighting elements is connected to the other contact, 1534B, of one of switches 1536. For example, the outputs of weighting element $h_A(0)$ and $h_B(0)$ are connected to contacts 1534A(0) and 1534B(0), respectively, of switch 1536(0), the outputs of weighting elements $h_A(1)$ and $h_B(1)$ are connected to contacts 1534A(1) and 1534B(1) of switch 1536(1), and the outputs of weighting elements $h_A(N-1)$ and $h_B(N-1)$ are connected to contacts 1534A(N−1) and 1534B(N−1), respectively, of switch 1536(N−1). Movable switch elements 1536 are all coupled to a combinatorial summing network 1538. Switches 1536 are ganged for simultaneous operation.

In operation of the arrangement of FIG. 7, switches 1536 are thrown to the positions appropriate to the subpulse sequence of that one of the A and B sequences (or other sequences, as appropriate) which currently transverses the delay line. This connects the corresponding weighting elements ($h_A$ or $h_B$) in-line, so that the summing element 1538 responds to a match to the subpulse sequence. Consequently, a compressed pulse is generated on output data path 1540b. At the appropriate time during the change-over between A and B received sequences, ganged switches 1536 are thrown to the alternate position (the position illustrated), thereby placing the $h_B$ weighting in-line. The filter then responds when the B sequence is matched, by producing a second compressed pulse on data path 1540b. Thus, it can be seen that a switched-tap filter produces sequential compressed pulses on data path 1540b in response to the two complementary sequences.

Referring once again to FIG. 6, the compressed pulse pair produced by any one of, or by more than one of, matched filters 1514, may appear on the associated one or more data path 1540 if the target radial velocity includes components producing a Doppler shift within the Doppler channel bandwidth. The output of each filter 1514 is applied to a single pulse, double throw switch illustrated by a mechanical switch symbol 1516. Switches 1516 are ganged together, and are illustrated in the position selected for routing the first of the two compressed pulses to a delay 1520. Switches 1516 of FIG. 6 may be ganged with switches 1536 of FIG. 7 for simultaneous operation therewith. For example, the first (A) compressed pulse produced at the output of filter 1514b is routed by switch *1516b* to a delay element 1520b, which delays for a time MT/2, as described in conjunction with FIG. 4. Switch 1516b then switches concurrently with arrival of the B pulse sequence at filter 1514b, and routes the B compressed pulse to a summing circuit 1522b, for summing with the delayed compressed A pulse, as described in conjunction with FIG. 4.

Figure 8:
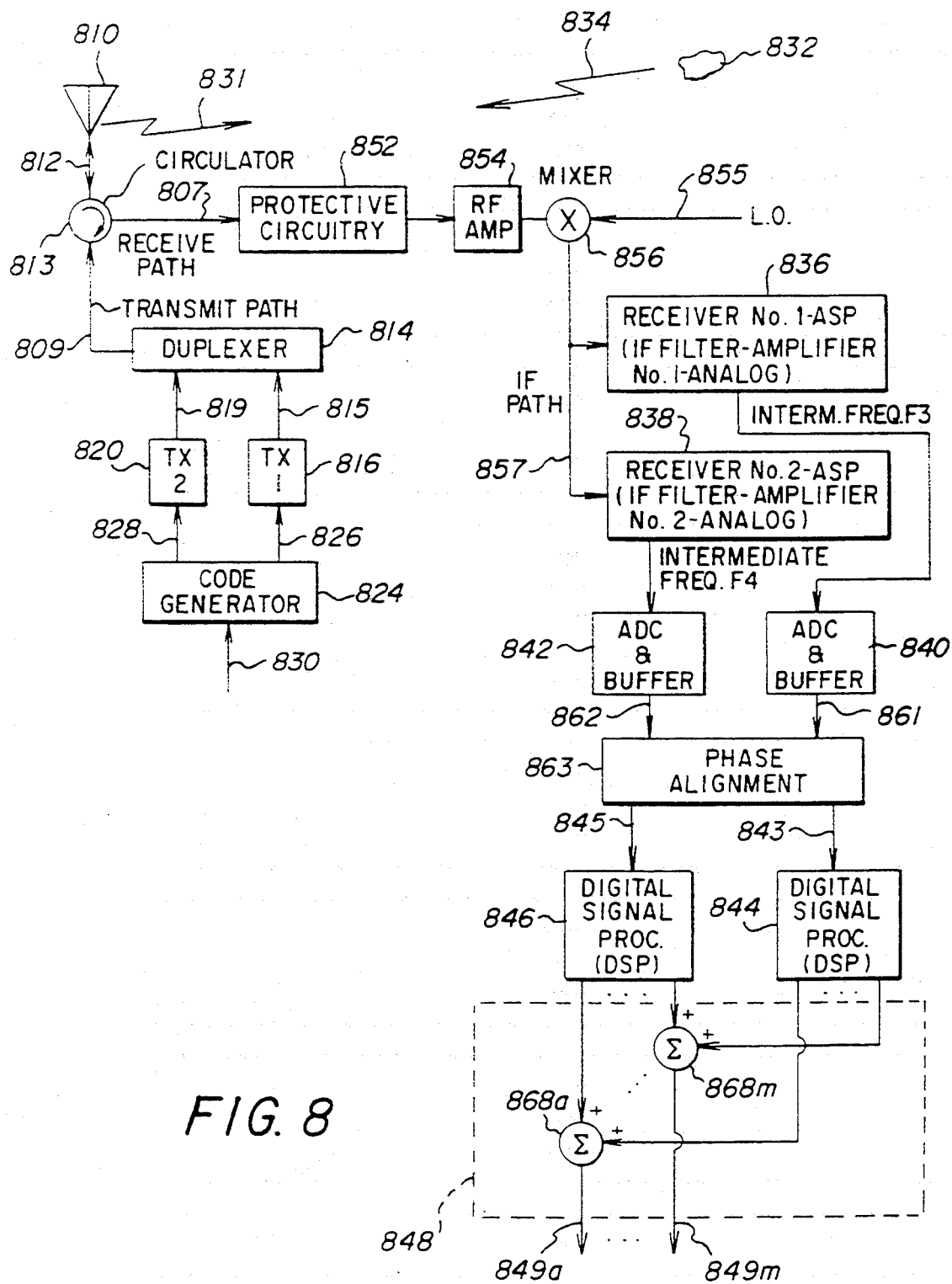
FIG. 8 is a simplified block diagram of a simultaneous-transmission, complementary code receiving and processing arrangement according to copending patent application Ser. No. 08/079,725, filed Jun. 21, 1993 in the name of Urkowitz.

FIG. 8 is a simplified block diagram of a system for simultaneous transmission of two signals, each coded with one of mutually complementary codes, as described in more detail in copending patent application Ser. No. 08/079,725, filed Jun. 21, 1993 in the name of Urkowitz. In FIG. 8, a transmit-receive antenna 810 is coupled to the input-output port 812 of a circulator 813 for separating input and output energy. A first controllable radio-frequency source, modulator or "transmitter" (TX 1) 816, operating at a first carrier frequency F1, is coupled, through a transmit path 815, to a duplexer or combiner 814, as well known in the art. A second controllable radio-frequency electromagnetic signal source, modulator or "transmitter" (TX2) 820, operating at a second carrier frequency F2, is also coupled to duplexer 814, through a transmit path 819. A pulse code generator 824 recurrently produces first and second pulses or sets of subpulses ("chips") under the control of timing signals applied over a control signal path 830 from a radar controller (not illustrated), and applies the pulses so produced over paths 826 and 828, respectively, to transmitters 816 and 820, respectively. In accordance with an aspect of the invention, the first and second sets of pulses are each dispersed in time, and are phase coded in a mutually complementary manner, so that, after pulse compression by code-matched filtering, described below, the main range lobes of the two compressed pulses are of the same sign or polarity, and the range sidelobes are of mutually opposite sign or polarity. The carrier signals produced by transmitters 816 and 820 are phase modulated by the first and second pulses (sets of subpulses), respectively, during recurrent transmitted pulse intervals Thus, each transmitted pulse is occupied by a set of subpulses or chips, and both pulses are simultaneously transmitted, each modulated by a mutually complementary subpulse set.

Transmitters 816 and 820 are operated simultaneously at different carrier frequencies, with each overall carrier pulse phase-modulated by a set of subpulses, organized according to one of the complementary codes. The two transmitted pulses from transmitters 816 and 820 at their respective carrier frequencies are applied to the two inputs of duplexer 814. Duplexer 814 combines the signals for application through circulator 813 to antenna 810. Antenna 810 transmits the two signals simultaneously, as represented by arrow 831. A target, represented by 832, reflects a portion 834 of the energy back toward antenna 810. The velocity of propagation is the same for transmitted signals at both frequencies, so both signals arrive at the target simultaneously.

The coded signals at the two frequencies are reflected by the target to form echo signals, which return to antenna 810 of FIG. 8, and from antenna 810 to circulator 813. Circulator 813 separates transmit and receive path 809 and 807. The signal in receive path 807 is applied to protective circuitry, well known in the art, and illustrated as a block 852, to protect subsequent circuits from the large signal that "leaks" through circulator 813 into the receive path during transmission. The received signal is then applied to an RF amplifier 854 to boost the signal to a level appropriate for input to mixer 856. The combination of RF amplifier 854, mixer 856, and the local oscillator (L.O.) signal applied over path 855 together provides low noise amplification, RF bandpass filtering, and downconversion to an intermediate frequency (IF) signal which appears on IF path 857. When mixed or heterodyned with local oscillator (LO) signal applied over a path 855, the resulting mixed intermediate frequency (IF) signal includes components resulting from echoes at both transmitted frequencies. The mixed intermediate frequency signal is applied through an IF signal path 857 to a first receiver 836, and to a second receiver 838, for filtration as known in the art. The IF signal in path 857 is sufficiently wide in frequency so that it covers the band of frequencies encompassed by receivers 836 and 838. Receivers 836 and 838 have the same bandwidths. Receiver 836 is centered at an intermediate frequency F3, and receiver 838 is centered at an intermediate frequency F4. Frequencies F3 and F4 are far enough apart so there is no significant overlap of the pass bands of the two receivers. Each receiver 836 and 838 is an analog filter-amplifier in the sense that each amplifies and passes a frequency band appropriate to the bandwidths of the two transmitted waveforms, with enough frequency separation to prevent significant frequency overlap.

The echo signals at the outputs of receiver 36 and of receiver 38 of FIG. 8 will be phase coded differently, in accordance with the first and second mutually complementary codes. Analog receivers 36 and 38 perform approximate matched filtering of the subpulses of the two phase coded waveforms, as is well known in the art. The passbands of the two analog receivers are shaped to approximate the frequency characteristics of the subpulses in each waveform.

The analog echo signals at the output of receiver 836 of FIG. 8 are applied to an analog-to-digital converter (ADC) 840, for conversion from analog form to digital form. ADC 840 may also include a buffer, if desired.

Similarly, the output of receiver 838 is applied to ADC & buffer 842, in which the signals are processed for conversion to digital form. The conversion from analog to digital form may be accomplished in at least two ways, both well known in the art. One way uses direct conversion from an offset intermediate frequency to digital form. The other way uses a pair of product detectors comprising two mixers and two lowpass filters feeding into two baseband analog to digital converters to form the real and imaginary parts of the complex baseband signal. The digital signals produced by ADCs 840 and 842 are applied to a phase alignment block 863 over paths 861 and 862, respectively. Phase alignment block 863 brings the signals in the two receiver paths into phase alignment. The phase aligned digital signals are applied via paths 843 and 845 to digital signal processors (DSPs) 844 and 846, respectively, for processing by steps including the steps of filtering matched to the codes of first and second pulse sets, as described below, so as to form first and second compressed pulses in which the main range lobes are of the same sign or polarity, and in which the range sidelobes are of the same amplitude and of mutually opposite polarity. The compressed pulses produced by DSPs 844 and 846 are applied to the input ports of a summing ($\Sigma$) circuit 848, which includes a plurality of summing circuits 868a–868m, to thereby vectorially sum the compressed A and B pulses from DSP 844 and 845, thereby canceling the range sidelobes, and leaving the main range lobe, to produce the desired range sidelobe suppressed pulses.

Figure 9A:
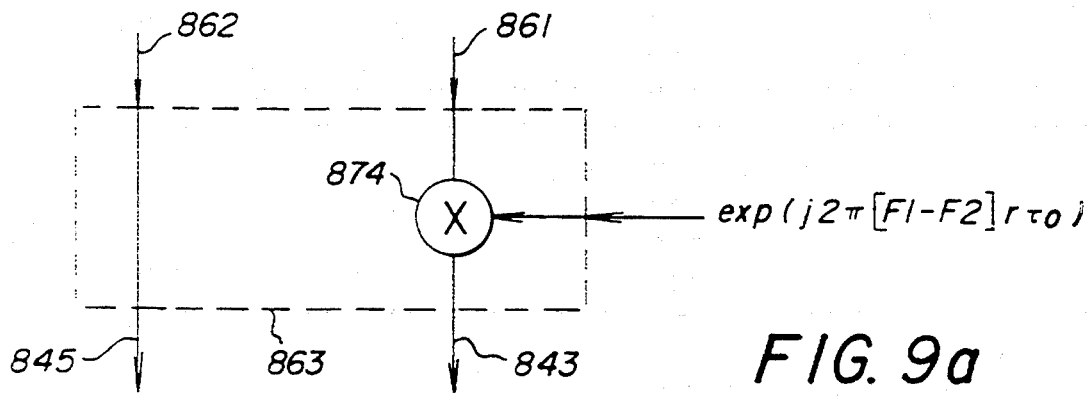
FIGS. 9a and 9b are simplified block diagrams of different embodiments of a simplified block diagrams of a portion of the processing apparatus of FIG. 8 in which received signals at different frequencies are brought into phase alignment.
Figure 9B:
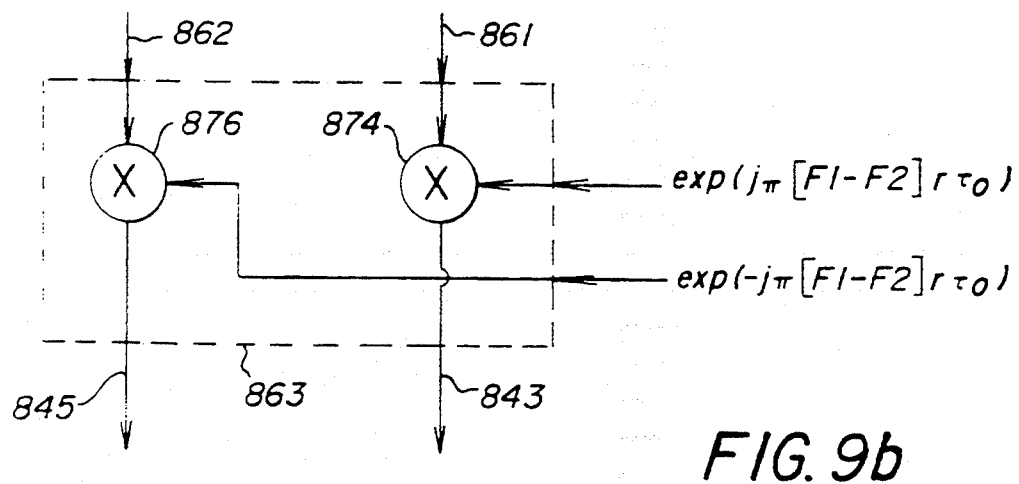

FIGS. 9a and 9b show alternative embodiments which may be used for producing phase alignment in block 863 of FIG. 8. In FIGS. 9a and 9b, two input paths 861 and 862 carry signals at carrier frequencies F1 and F2, respectively. Therefore, for any given range delay $r\tau_o$, where $\tau_o$ is the range sampling period and r is an integer index, two signals will be misaligned in phase by an amount $$2\pi r \tau_o (F1 - F2) \quad (2)$$

A phase correction of this magnitude may be applied entirely to the signal in path 861, as in FIG. 9a. Alternatively, the correction may be split between paths 861 and 862, as in FIG. 9b.

FIG. 9a shows a first embodiment in which phase alignment block 863 contains two inputs 861 and 862, but only input 861 is multiplied, via a complex digital multiplier 874, by the correction signal $$\exp [2\pi r \tau_o (F1 - F2)] \quad (3)$$

which brings the two output signals on paths 843 and 845 into phase alignment. FIG. 9b shows a second embodiment, in which phase alignment block 863 accepts signals over two input paths 861 and 862, with both multiplied, respectively, via complex digital multipliers 874 and 876, by phase corrections:

$$\exp [j\pi (F1 - F2) r\tau_o] \quad (4)$$

for signal on path 861, and $$\exp [-j\pi (F1 - F2) r\tau_o] \quad (5)$$

for signal on path 862, which introduces equal and opposite phase corrections to bring the output signals on paths 843 and 845 into phase congruence.

The radar system of FIG. 8, by comparison with the arrangement of U.S. Pat. No. 5,151,702, reduces the time required to produce range information in the presence of clutter and may provide reduced sidelobes in those cases in which the target exhibits rapid changes in reflective characteristics, since both of the echoes used to produce the reduced range sidelobe compressed range pulse are reflected by the target simultaneously.

Figure 10A:
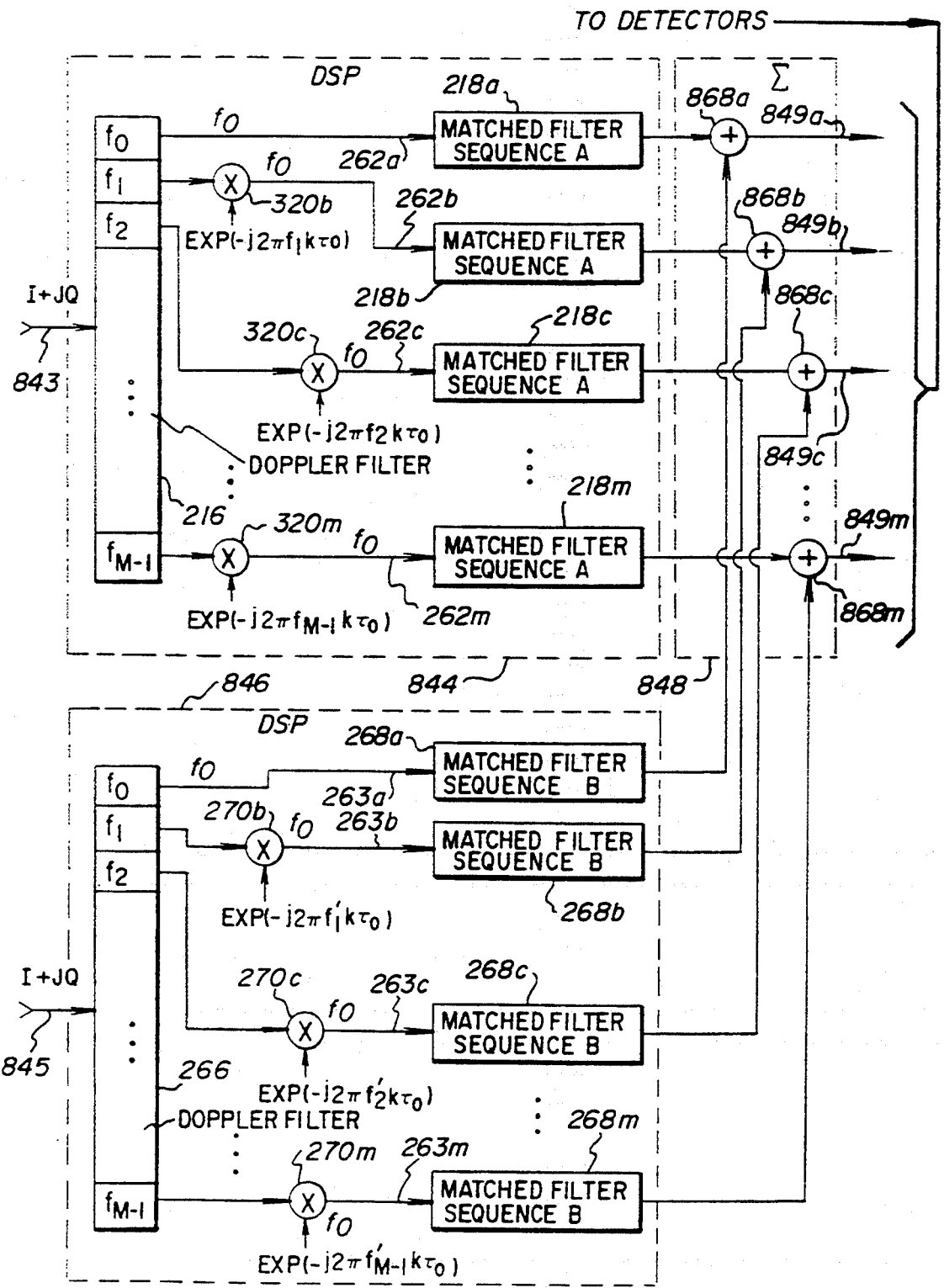
FIG. 10a is a simplified block diagram of the portion of the processing apparatus of FIG. 8.

FIG. 10a is a simplified block diagram of summer 848, and of digital signal processors 844 and 846 of FIG. 8. Elements of FIG. 10a corresponding to those of FIG. 8 are designated by like reference numerals. In general, received signals encoded with code sequences A and B are separately applied to Doppler filters 216 and 266, respectively, of FIG. 10a. The output of each Doppler filter of FIG. 10a is heterodyned, as described below, with the output of a complex digital oscillator, the frequency of which corresponds to the Doppler frequency of that filter. The oscillator wave is preferably a digital stream at the range sampling frequency. The heterodyning removes the Doppler phase shift along the range dimension. The result is a signal whose spectrum has been shifted to zero frequency. The resulting zero frequency wave then undergoes matched filtering (i.e., pulse compression) by a filter matched to the corresponding code sequence A or B to produce compressed output signals, and the compressed output signals are summed. The resulting sums are pulse compressed, range sidelobe suppressed, signals. The range sidelobe suppression occurs because, as described above, the range sidelobes are complementary (i.e., equal in magnitude but opposite in sign). Each resulting sum is ultimately coupled to a corresponding amplitude detector (not illustrated in FIG. 10a) to generate signals which, when arrayed, can be sorted according to the velocity of the target by selecting the appropriate detector output. Thus, the presence of a target signal at the output of a Doppler filter indicates that the target has a particular radial velocity. Within each Doppler frequency bin, the target range is known from the time of arrival of the signal. Also, the signals produced by the detectors may be coupled to threshold circuits in further digital processing, to allow separation of significant returns from noise, and thence for further processing and display. The several outputs of the detectors form a "periodogram", which is an estimate of Doppler power density spectrum of the echo. Such an estimate is useful when the echo is produced by meteorological phenomena, and can be used to help in determining the presence of hazardous weather conditions. The circuits fed by the sums of the various pairs of Doppler filter elements $f_0$, $f'_0$, $f_1$, $f'_1$, $f_2$, $f'_2$, . . . ; $f_{M-1}$, $f'_{M-1}$ of filter banks 216 and 266 may each be considered a "Doppler channel." Thus, filter element $f_0$ and the following circuits, namely matched filter 218a, constitute a Doppler channel relating to targets with a low radial velocity, while filter element $f_2$, multiplies 220b and matched filter 218b together constitute another Doppler channel relating to targets with a larger radial velocity, corresponding to $f_2$.

Referring now to FIG. 10a, a digital signal comprising in-phase (I) and quadrature (Q) baseband components encoded with a first code sequence (A) is applied from phase alignment block 863 of FIG. 8 over data path 843 to digital signal processor 844 of FIG. 10a.

Within processor 844 of FIG. 10a, the signal is applied to a Doppler filter bank 216. Filter bank 216, which includes a plurality of narrow-band Doppler filters, each of which responds to a particular narrow frequency band $f_0, f_1, f_2, \ldots, f_{M-1}$, to thereby separate the incoming signal corresponding to phase code A into a plurality of frequency bins, the frequencies of which depend upon the Doppler frequency attributable to the radial velocity of the target. The frequency-separated signal in each frequency bin is also encoded with phase sequence A.

Similarly, a digital signal comprising inphase (I) and quadrature (Q) baseband components encoded with a second code sequence (B), which is complementary to code A, is applied from phase alignment block 863 of FIG. 8 over data path 845 to digital signal processor 846 of FIG. 10a. Within processor 846, the signal is applied to a Doppler filter bank 266 of FIG. 10a, which is similar to Doppler filter bank 216. As in filter bank 216, Doppler filter bank 266 includes a plurality of narrow-band Doppler filters. In Doppler filter bank 266, each filter responds to a particular frequency band $f_0, f'_1, f'_2, \ldots f'_{M-1}$, to thereby separate the incoming signal corresponding to the complementary B phase code, into a plurality of frequency bins, the frequencies of which depend upon the Doppler frequency attributable to the radial velocity of the target. The frequency separated signal in each frequency bin is encoded with phase sequence B. The Doppler frequencies $f'_1, f'_2, \ldots f'_{M-1}$ at the outputs of the frequency bins of Doppler filter 266 of FIG. 10a differ from the Doppler frequencies $f_1, f_2, \ldots f_{M-1}$ at the outputs of the frequency bins of Doppler filter 216 of FIG. 10a because, for the same radial target velocity, the Doppler frequencies are proportional to the two carrier frequencies. The relationships between Doppler frequencies $f_1, f_2, \ldots f_{M-1}$ and $f'_1, f'_2, \ldots f'_{M-1}$ for a set of radial velocities $v_1, v_2, \ldots v_{M-1}$ and for carrier frequencies F1 and F2, are $$f_i = \frac{2v_i}{c} F1, i = 0, 1, \ldots, M-1 \quad (6)$$

$$f'_i = \frac{2v_i}{c} F2, i = 0, 1, \ldots, M-1$$

Thus $$f'_i = f_i (F2/F1), i = 0, 1, \ldots, M-1 \quad (7)$$

For a stationary target, $v_o = 0$, so that $f_o = f'_o = 0$.

The filtered output signals from Doppler filter bank 216 of FIG. 10a are applied (except for the $f_0$ signal) to a bank of multipliers, for reasons described at length above, whereby all the signals are at frequency $f_0$. The m signals from Doppler filter bank 216 are applied by way of paths 262a–262m to A sequence matched filters 218a–218m, respectively, for generating a plurality of compressed A sequences, which are applied to first inputs of summing circuits 868a–868m, respectively.

The filtered output signals from Doppler filter bank 266 of FIG. 10a are similarly applied (except for the $f_0$ signal) to a bank of multipliers, whereby all the signals are at frequency $f_0$. The m signals from Doppler filter bank 266 are applied by way of paths 263a–263m to A sequence matched filters 268a–268m, respectively, for generating a plurality of compressed A sequences, which are applied to second inputs of summing circuits 868a–868m, respectively. Summing circuits 868a–868m of summing block 848 sum the A and B compressed pulses in each of the Doppler channels to produce the desired compressed range pulses.

In FIG. 10a, pulse compression is accomplished by performing matched filtering on each individual Doppler channel. The matched filter is matched to the pattern of phase changes associated with the dispersed pulse code A or B transmitted with carrier frequency F1 or F2, respectively. One A-code matched filter 218, which may also be termed a pulse compressor, is associated with each Doppler filter element $f_0, f_1, f_2, \ldots f_{M-1}$ of Doppler filter bank 216. One B-code matched filter 268 is associated with each Doppler filter element $f'_0, f'_1, f'_2, \ldots f'_{M-1}$ of Doppler filter bank 266. It would be possible to make each pulse compressor with different filtering parameters to optimize pulse compression for the center frequency of the associated Doppler filter element. This would improve the overall performance, because the range of frequencies at the output of each filter is small, on the order of a few Hertz. This may represent a small percentage of the center frequency of the filter. Thus, each pulse compressor may be optimized at one frequency, and its performance will not be excessively degraded by the small phase shifts attributable to a range of frequencies which is a small percentage of the optimized frequency. To avoid the need for different filter parameters in each of the pulse compressors so that identical compressors may be used with each Doppler filter bank for cost reasons, the filtered output signal from each filter element of filter banks 216 and 266 (except the lowest-frequency filter element $f_0, f'_0$) is converted to a common frequency range. A suitable range is the zero frequency range of filter element $f_0$, which may for example be the range extending from zero Hertz to a few Hertz.

The same heterodyning principles apply to the outputs of both Doppler filter banks 216 and 266, the heterodyne processing of the output of Doppler filter bank 216 is described in detail. In FIG. 10a, the output from filter element $f_0$ of filter bank 216 is applied directly to a pulse compressor 218a, because the output frequency range of filter element $f_0$ is already at zero frequency, and therefore no frequency conversion is necessary. The outputs from all the other filter elements $f_1, f_2, \ldots, f_{M-1}$ are individually applied to multipliers 220 for converting each filter output to zero frequency. For example, filter element $f_1$ of filter bank 216 has its output connected to a first input port of a multiplier 220b. Multiplier 220b has a second input port coupled to an oscillation source (not illustrated in FIG. 10a) of signal $$\exp(-j2\pi f_1 k\tau_0), k = 0, 1, \ldots$$

where $f_1$ is the center frequency of the corresponding filter element of filter bank 216, $\tau_0$ is the range sampling period, and k is the integer time index.

The oscillator frequency is thus the negative (i.e., same absolute frequency but 180° out-of-phase) of the center Doppler frequency at which the corresponding filter element of filter bank 216 of FIG. 10a is centered. For example, the oscillator signal $\exp(-j2\pi f_2 k\tau_0)$ applied to multiplier 220c has a frequency that is the negative of frequency $f_2$ at which filter element $f_2$ of filter bank 216 is centered. Essentially, the output signals of the individual elements $f_1, f_2, \ldots, f_{M-1}$ of Doppler filter bank 216 are heterodyned by multipliers 220 to be centered at zero frequency, whereupon identical zero frequency pulse compression filters 218 may be used in each Doppler channel. For example, pulse compressor 218a is coupled to filter element $f_0$, and provides zero frequency A-code matched filtering; pulse compressor 218b is coupled to the output of multiplier 220b for receiving therefrom filtered signals originally at $f_1$ but downconverted to zero frequency, and performs A-code matched filtering in the zero frequency signal. The process of downconversion is illustrated generally in FIG. 3, in which filtered signals at frequencies $f_1 \ldots f_{M-1}$ are converted to zero frequency by the multiplying processes represented by arrows 912, 913, 914, ... 91m. Each of the other pulse compressors 218c ... 218m of FIG. 2 also receives signals downconverted to zero frequency. Thus, all A-code matched pulse compressors 218 are mutually identical. Similarly, all B-code matched pulse compressors 268a, 268b, 268c, ... 268m associated with the output of Doppler filter bank 266 are mutually identical.

The A-code filtered output signals from pulse compressors 218a ... 218m of FIG. 10a are applied to a multiplicity of adders 222a, 222b, ..., 222m. Each adder 222a, 222b, ... 222m of FIG. 2 has as its other input the downconverted, B-coded pulse compressed output of the corresponding Doppler channel of Doppler filter bank 266.

As mentioned above, Doppler filter bank 266 is similar to Doppler filter bank 216 in that it is a bank of filters, but the specific Doppler frequencies at which these filters are centered differ slightly from those of filter bank 216 as described below, because a given target closing speed results in different Doppler frequencies resulting from the two carrier frequencies F1 and F2.

In Doppler filter bank 266, the center frequencies to which the filters are tuned are:

$$f'_0(\text{same as } f_0), f'_1, f'_2, \ldots, f'_{M-1} \quad (9)$$

The following relationship exists between $f_k$ and $f'_k$ $$f'_k = (F3/F1) f_k, \; k=0, 1, 2, \ldots M-1 \quad (10)$$

In FIG. 10a, the $f_0$ output from filter element $f'_0$ of filter bank 266 is applied directly to a pulse compressor (i.e., a filter matched to biphase code sequence B that is complementary to the biphase code sequence A) because the output of filter element $f'_0$ is already at zero frequency and therefore no frequency conversion is necessary. The outputs from all the other filter elements $f'_1, f'_2, \ldots, f'_{M-1}$ are individually coupled to multipliers 270 for converting each filter output to zero frequency. For example, filter element $f'_1$ of filter bank 266 has its output connected to a first input port of a multiplier 270b. Multiplier 270b has a second input port coupled to an oscillation source (not illustrated in FIG. 10a) of signal $$\exp(-j2\pi f_1 k \tau_0), \; r=0, 1, 2, \ldots \quad (11)$$

where $f'_2$, is the center frequency of the corresponding filter element of filter bank 266, $\tau_0$ is the range sampling period k is the integer time index all as described above in conjunction with filter bank 216, so that identical zero frequency pulse compression filters 268 (matched to code sequence B) may be used in each Doppler channel. For example, pulse compressor (i.e., B-code matched filter) 268a is coupled to filter element $f'_0$ (which is the same frequency as $f_0$), and provides zero frequency matched filtering; B-code matched pulse compressor 268b is coupled to the output of multiplier 270b for receiving therefrom filtered signals originally at $f'_1$ but downconverted to zero frequency, and performs matched filtering (i.e., pulse compression) in the zero frequency signal, all as described above in conjunction with FIG. 11, but in which $f_1, f_2, \ldots, f_{M-1}$ are replaced, respectively, by $f'_1, f'_2, \ldots f'_{M-1}$. Each of the other pulse compressors 218c, ..., 218m also receives signals downconverted to zero frequency. The output signals from pulse compressors 268a, ..., 268m are applied to the other input ports of adders 222a, ..., 222m for summing with the corresponding A-code pulse compressed signals. The set of resulting summed signals goes to detectors and/or further processing as mentioned above.

The two inputs to each of the adders 222a, 222b, 222c, ... 222m of FIG. 10a are mutually complementary compressed signals from, respectively, Doppler filtered first and second code sets, code set A and code set B. The compressed codes A and B have main lobes which are the same, as described below which therefore add, but have range sidelobes of equal but mutually opposite polarities, which cancel when summed. The signals on output paths 49a, ..., 49m, are therefore almost completely free of range sidelobes.

A pulse compressor follows each of the complex multipliers in FIG. 10a. Since each complex multiplication removes the residual Doppler phase shift across the uncompressed pulse, no residual Doppler phase shift remains on the uncompressed pulse. Each pulse compressor is a zero Doppler design. All of the pulse compressors are therefore identical for each of the Doppler filter banks in FIG. 10a. FIG. 5 illustrates a tapped delay line or transversal filter of the type known as a "finite impulse response" (FIR) filter, because a change in the input causes a change in the output which extends over a finite time. The FIR filter of FIG. 5 may be used as a matched filter (pulse compressor) 218 or 268 component in the arrangement of FIG. 10a. For definiteness, the structure of FIG. 5 represents a zero Doppler matched filter 218 of FIG. 10a. As illustrated, matched filter 218b of FIG. 5 includes a delay structure 440 which receives signal at its input port 442 and causes the signal to propagate to the right, past taps illustrated as nodes 444a, 444b ... 444n. The temporal spacing (delay) between adjacent taps equals range sampling period $\tau_0$. The delay structure, if in digital form, may be a shift register. Each node 444 is coupled to a tap weight multiplier illustrated by a triangular symbol 446a, 446b ... 446n. The weighted, delayed signals from multipliers 446 are applied to a combinatorial summer ($\Sigma$) 450 for producing the desired matched filtered (pulse compressed) signals, which are applied to the corresponding summer 222 of FIG. 10a.

Figure 10B:
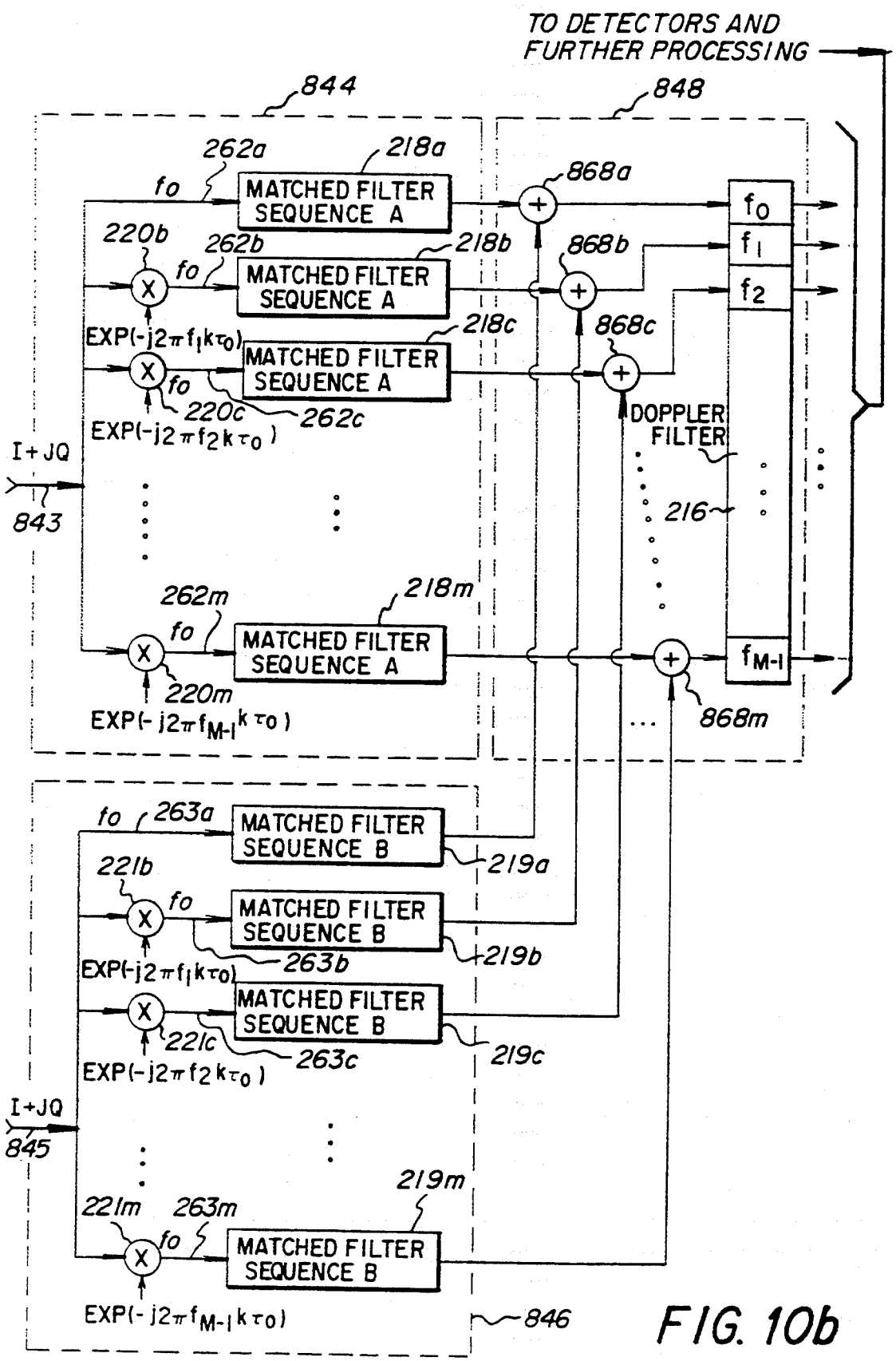
FIG. 10b is a block diagram, corresponding to that of FIG. 10b, of an embodiment of the invention, in which the Doppler filtering follows the complementary processing.

FIG. 10b is a simplified block diagram of a digital signal processing according to the invention, which may be used with the arrangement of FIG. 8. The arrangement of FIG. 10b differs from the arrangement of FIG. 10a in that a single Doppler filter bank 216 is coupled to the output of the digital signal processing, as was described generally in conjunction with FIG. 4. The outputs of phase alignment block 863 of FIG. 8 on paths 843 and 845 are coupled, in common as to each path, to the A sequence matched filters 218a–218m and the B sequence matched filters 219a–219m, respectively, of FIG. 10b. As illustrated in FIG. 10b, downconversion to baseband is performed on unfiltered A and B input signals by two sets of multipliers, namely on the A sequence by multipliers 220b–220m in digital signal processing block 844, and on the B sequence by multipliers 221b–221m in digital signal processing block 846. The reasons for the multiplication are described above. Thus, the phase aligned complementary signals applied to the matched filters are not Doppler filtered before application to the multipliers. In digital signal processor block 844 of FIG. 10b, the $f_0$ signal and the downconverted signals from multipliers 220 are applied to matched filters 218. Similarly, in digital signal processor block 846, the $f_0$ signal and the downconverted signals from multipliers 221 are applied to matched filters 219, without previously being Doppler filtered. The compressed pulses at the outputs of matched filters 218a–218m of digital signal processor 844 of FIG. 10b are applied to first inputs of corresponding summing circuits 868a–868m of summing block 848. The compressed pulses at the outputs of matched filters 219a–219m of digital signal processor 846 of FIG. 10b are applied to second inputs of corresponding summing circuits 868a–868m of summing block 848, in which the compressed A and B sequences are added together to reduce range sidelobes. According to the invention, Doppler filter bank 216 of FIG. 10b is coupled to the outputs of summing circuits 868a–868m.

It should particularly be noted that instead of a single Doppler filter bank 216 coupled to the outputs of summing circuits 868a–868m as in FIG. 10b, two Doppler filter banks could be used in a corresponding arrangement. Such an arrangement would place one of the two Doppler filter banks between the outputs of A sequence matched filters 218a–218m and first input ports of summing circuits 868a–868m of FIG. 10b, and the other of the two Doppler filter banks would be placed between the outputs of B matched filters 219a–219m and the second input ports of summing circuits 868a–868m.

Figure 11:
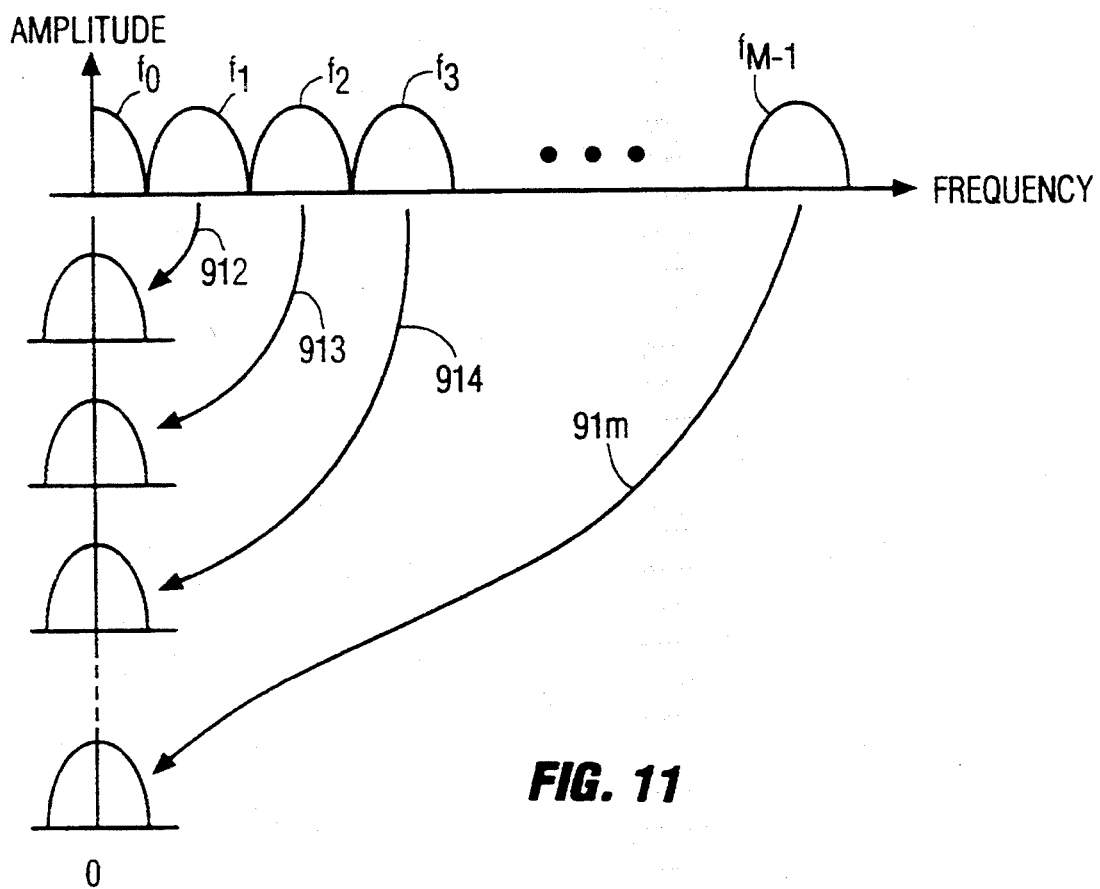
FIG. 11 represents amplitude-frequency spectra and the way they are rearranged by multiplication.

FIG. 11 illustrates a zero frequency spectrum $f_0$ and additional spectra $f_1$, $f_2$, $f_3$ . . . $f_{M-1}$, which together represent the output signals from filter bank 216 of FIG. 10a. An echo having a given Doppler shift produces a substantial output from the output port of only one filter. For best velocity selectivity, the bandwidths of filter elements $f_0$, $f_1$, $f_2$ . . . $f_{M-1}$ of filter bank 216 of FIG. 4, 6, 10a or 10b are narrow, in the range of a few Hertz or less. The bank of Doppler filters represented as block 216 may be implemented by a signal processor performing a discrete Fourier transform (DFT) by means of a fast Fourier transform (FFT) algorithm. The output of each filter is a range trace which is the sum of a sequence of Doppler filtered range traces. A particular filter output, therefore, represents target echoes having the particular Doppler frequency shift corresponding to its center frequency, and a small range of Doppler shifts about that center frequency, which depends upon the bandwidth of the filter.

In order to perform the invention, transmitters 16 and 20 of FIG. 8 must cause each transmitted pulse (each sequence of phase-modulated subpulses or chips) to be matched or accompanied by a corresponding simultaneously transmitted pulse in which the phase sequence of the subpulses is complementary to the first phase sequence. For this purpose, the term complementary means that the sum of the time autocorrelation functions of the two pulse sets or sequences ideally has no sidelobes outside of the main lobe. Waveform 1000 of FIG. 12a represents a pulse formed from four subpulses or chips 1001, 1002, 1003 and 1004, having amplitudes of 1, −1, 1, 1, respectively, which may be viewed as unit vectors with relative phases of 0, $\pi$, 0, 0, respectively. FIGS. 12a–12i (where the hyphen represents the word "through") represent steps in forming an autocorrelation function, and FIGS. 12j–k 12m–s represent the result of the autocorrelation. As is well understood by those skilled in the art, autocorrelation "scans" the time function across a corresponding time function "moving" in the negative time direction, multiplying together the "overlapping" portions and summing the products. For example, an autocorrelation is performed on waveform 1000 of FIG. 12a by allowing it to stand still (or move to the right), while causing a similar waveform 1000', including subpulses 1001', 1002', 1003' and 1004' to move to the left, as indicated by the direction arrows in FIG. 12a. In FIG. 12a, waveforms 1000 and 1000' do not overlap, so their product is zero, and no output signal is produced, as illustrated in FIG. 12j. While the amplitudes of the positive and negative excursions of both pulses 1000 and 1000' are unity, pulse 1000' is illustrated as slightly larger than pulse 1000 to allow them to be visually distinguished. In FIG. 12b, corresponding to time interval 0–1 (where one time interval corresponds to the duration of a subpulse or chip), subpulses 1004 and 1001' overlap, both are positive so their product is positive, and the overlap region is increasing in area, so the resulting autocorrelation 1010 is a positive-going ramp increasing from zero amplitude, as illustrated between times 0 and 1 in FIG. 12k.

At the end of time interval 0 to 1, the overlap of subpulses 1004 and 1001' is complete, and ramp 1010 of FIG. 12k reaches a maximum value of 1. Immediately thereafter, negative subpulse 1002' begins to overlap positive subpulse 1004, while positive subpulse 1001' moves to the left, to overlap portions of subpulse 1003, as illustrated in FIG. 12c. The product of subpulse 1001' multiplied by portions of subpulses 1004 and 1003 remains constant in the time interval 1–2, while the product of negative subpulse 1002' multiplied by portions of positive subpulse 1004 increases in magnitude, with a negative sign. The sum of these products in the time interval 1 to 2 is a negative-going ramp portion of waveform 1010, as illustrated in FIG. 12m. At time 2, positive subpulse 1001' overlaps positive subpulse 1003 for a product of +1, and negative subpulse 1002' overlaps positive subpulse 1004, for a product of −1, the net of which is zero, as illustrated by plot 1010 in FIG. 12n at time 2. In the time interval 2 to 3, the summed product continues to ramp toward a value of −1, as illustrated in FIG. 12n.

In the time interval 3 to 4, waveforms 1000 and 1000' move toward congruence, as illustrated in FIG. 12e. The main autocorrelation lobe peaks during congruence of identical waveforms. At time 4, congruence is reached, with positive subpulse pairs 1001, 1001'; 1003, 1003', and 1004, 1004', and negative subpulse 1002, 1002' overlapping for a total magnitude of 4, as illustrated in FIG. 12p.

Following time 4 represented in FIG. 12p, waveforms 1000 and 1000' move away from congruence, as illustrated in FIG. 12f. The negative subpulses, 1002 and 1002' have significant overlaps with positive subpulses, and the overlap of positive subpulses 1001' and 1004 with their counterparts is progressively reduced in the time interval 4–5, resulting in a sharp drop of the autocorrelation toward a value of −1, as illustrated in FIG. 12q near time 5. From the above description, the mode of generation of autocorrelation waveform 1010 in the time interval 5–8, illustrated in FIGS. 12r and 12s, will be apparent, based upon the subpulse overlaps illustrated in FIGS. 12h and 12i.

FIG. 13a illustrates another subpulse 1100, which has positive unit value during the first of four clock cycles, and negative value for the three following clock cycles. Plot 1110 of FIG. 13b illustrates the autocorrelation of subpulse 1100 of FIG. 13a. comparison of the waveform of FIG. 13a with the waveform of FIG. 13s reveals that, while their main lobes each have positive amplitude at center time 4, the sidelobes are of equal magnitude and opposite polarity.

When waveforms 1010 and 1110 are summed in the adders 222 of summer 48 of FIG. 10a, the sidelobes in the intervals 0–3 and 5–8 cancel, leaving only the main lobe in the interval 3–5, as illustrated by waveform 1200 of FIG. 14. Waveform 1200 is the desired range lobe, with sidelobes cancelled by use of complementary pulse sequences.

As described above, the range sidelobes tend to cancel. If the input Doppler shift is not exactly equal to the center frequency of a Doppler filter element of filter bank 216, the range sidelobes may not cancel exactly, but the deterioration in the cancellation will not exceed that caused by a frequency shift equal to half the bandwidth of a filter element. Normally, this equals half the frequency spacing between adjacent filters of the filter bank.

Other embodiments of the invention will be apparent to those skilled in the art. For example, while a radar context is described in which electromagnetic radiation is directed toward a target, acoustic waves in a fluid medium could as easily be used, as in a sonar system, or other anomaly detector. While binary phase sequences have been described, other phase variations, such as continuous analog phase variations, may be used, so long as appropriate processing is used, and the autocorrelation functions have the desired property of low range sidelobes.

As noted in the Urkowitz '702 patent the AAA . . . AABB . . . BBB pulse sequence is not the only possible sequence, as sequences such as ABABAB . . . AB or AABBAABB . . . are also paired. So long as the sequences are summed so that the range sidelobes cancel, any sequences can be used. Other possibilities include ABC-DABCDA . . . ABCD where A and B are mutually complementary, and C and D are mutually complementary. With appropriate storage of all M echoes, the matched filters would be selected and switched accordingly, and appropriate delays and summing provided.

ADDENDUM

INTERCHANGE OF INTRAPULSE AND INTERPULSE FILTERING

A.1 Introduction

The purpose of this appendix is to show the equivalence of interchanging intrapulse (i.e., along the pulse in the range dimension) and interpulse (i.e., pulse-to-pulse) filtering operations. This will establish the functional equivalence of the present invention with that described the aforementioned Urkowitz '702 patent.

A.2 Glossary of Symbols

Note:
(1) A tilde $\sim$ above letter denotes complex envelope.
(2) A double underline denotes the pre-envelope.

c = speed of light
$f_c$ = carrier frequency
$f_d$ = Doppler frequency shift
$f_r$ = pulse repetition frequency
$f_k$ = internal reference Doppler frequency
g(t) = basic transmitted pulse
$g_R(t)$ = received pulse
$\tilde{g}_1$ (= complex envelope of $g_R(t)$ excluding initial phase shift
h(t) = impulse response of the filter performing pulse compression and sidelobe suppression (if any)
p(t) = output of filter whose impulse response is k(t)
q(t) = output of pulse-to-pulse Doppler filter
R = range of a target
$\dot{R}$ = range rate
s(t) = transmitted signal
t' = time along the duration of a pulse measured from the leading edge of the pulse
$y_n$ = sequence of complex envelope samples from a particular range delay, n = 1, 2, . . .
z(t) = result of filtering the sequence $y_n$
$\tau_i$ = range delay of a target
$\phi$ = initial phase shift of a target echo
$\omega_d = 2\pi f_d$
$\omega_r = 2\pi f_r$
$\omega_k = 2\pi f_k$

A.3 The Transmitted and Received Waveforms

Figure 15:
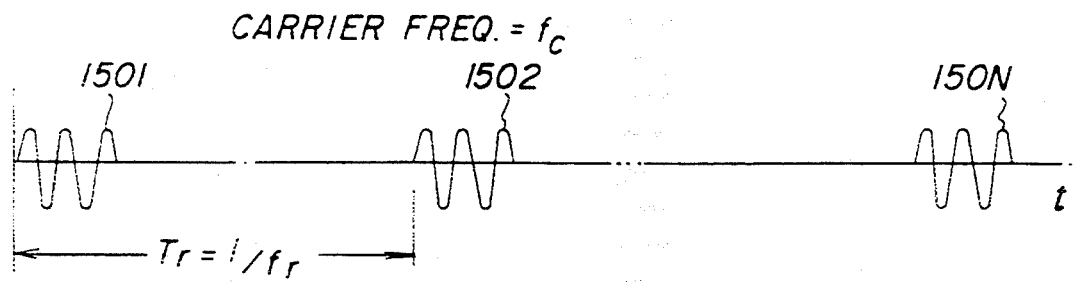
FIG. 15 is a representation of a time sequence of transmitted pulses whose phases are coherent.

Ordinary radar transmission consists of a sequence of pulses that are all similar and occur at a uniform rate called "pulse repetition frequency (PRF). This is illustrated in FIG. 15 for pulses 1501, 1502, . . . 15N of a simple form. Before we go into the mathematics, let's look into the situation qualitatively. We want to add echoes from these pulses and we want to add them in phase so that the sum will be a "coherent" sum. This means that the starting phase of each pulse 1501, 1502 . . . with respect to its own origin must be the same as that of every other pulse with respect to its origin. The origin for second pulse 1502 is $T_r$; for the third it is $2T_r$, etc. What this means is this: if the carrier frequency is $f_c$, there must effectively be an integer number of cycles in the time interval $T_r$. That is $$f_c T_r = \text{integer} \quad (A.1)$$

In an actual radar system, this is automatically accomplished (with acceptable error) by using an internal oscillator as the reference for the echoes from each pulse. Whatever the actual phase of the transmission, it is used as the reference phase, and thus labeled zero phase, for each transmitted pulse. This will ensure that (A.1) is satisfied.

Now we can turn to the algebra. Let g(t) denote the pre-envelope of the basis transmitted pulse. Then the sequence of N transmitted pulses may be described in pre-envelope form as $$\underline{s} = \sum_{n=0}^{N-1} \underline{g}(t - nT_r) = \sum_{n=0}^{N-1} \tilde{g}(t - nT_r)e^{j\omega_c(t - nT_r)} \quad (A.2)$$

where $\tilde{g}(t)$ is the complex envelope of g(t) and $$\underline{g}(t) = \tilde{g}(t)e^{j\omega_c t} \tag{A.3}$$

In view of (A.1), the exponent in (A.2) can be written $$e^{j\omega_c t - j\omega_c n T_r} = e^{j\omega_c t} \tag{A.4}$$

and (A.2) becomes $$\underline{s}(t) = e^{j\omega_c t} \sum_{n=0}^{N-1} \tilde{g}(t - nT_r) \tag{A.5}$$

Now let's look at the echo. We presume that the time $NT_r$ is not too large for a moving target to move more than a resolvable range interval. Then each pulse undergoes the same delay $\tau_i$. Furthermore, let a Doppler frequency $f_d = \omega_d/2\pi$ be imposed upon the echo. The relation between doppler frequency $f_d$ and range rate $\dot{R}$ is $$f_d = -2\dot{R}f_c/C \tag{A.6}$$

where $f_c$ is the reference or carrier frequency and c is the speed of light. The echo pre-envelope $g_R(t)$ may then be found by substituting $t - \tau_i$ for t and $f_c + f_d$ for $f_c$ in (A.5):

$$\underline{g}_R(t) = e^{j\omega_c t} e^{-j\omega_c \tau_i} e^{j\omega_d(t-\tau_i)} \tag{A.7}$$

$$\sum_{n=0}^{N-1} \tilde{g}(t - \tau_i - nT_r)$$

We seek the complex envelope $\tilde{g}(t)$. This is just the coefficient of $\exp(j\omega_c t)$. Thus, the complex envelope is $$\tilde{g}_R(t) = e^{-j\omega_c \tau_i} e^{j\omega_d(t-\tau_i)} \tag{A.8}$$

$$\sum_{n=0}^{N-1} \tilde{g}(t - \tau_i - nT_r)$$

The factor $e^{-j\omega_c \tau_i}$ represents an initial phase shift that is, in general, unknown. We therefore treat that phase as a random variable with a uniform probability density function over the interval $(0, 2\pi)$. This is the least favorable distribution. We set $$\phi = -\omega_c \tau_i \tag{A.9}$$

Figure 16A:
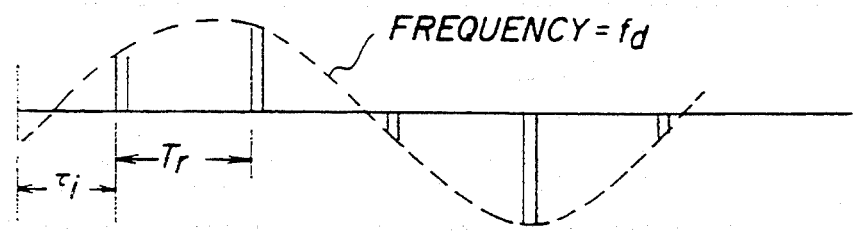
FIGS. 16a and 16b are, respectively, the representations of the in-phase (i) and quadrature (Q) modulation components of a Doppler shifted echo.
Figure 16B:
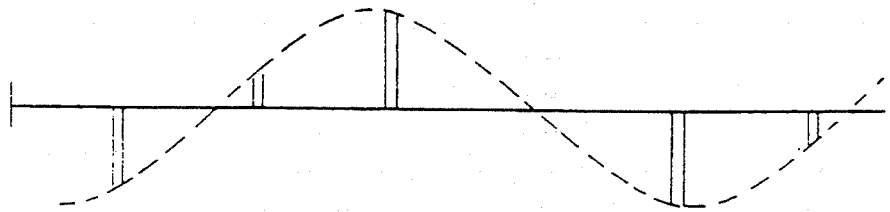

The factor $e^{j\omega_d(t-\tau_i)}$ is the doppler modulation upon the sequence of echoes. This modulation is illustrated in FIGS. 16a and 16b. FIG. 16a illustrates the in-phase modulation component I of a Doppler modulated pulse train. FIG. 16b illustrates the quadrature modulation component Q of the Doppler modulated pulse train. I and Q are, respectively, the real and imaginary parts of the complex envelope. $T_r$ is the pulse repetition period and $\tau_i$ is the range delay of the target echo. Now we may write (A.8) as $$\tilde{g}_R(t) = \tilde{g}_1(t) e^{j\phi} \tag{A.10}$$

where $$\tilde{g}_1(t) = e^{j\omega_d(t-\tau_i)} \sum_{n=0}^{N-1} \tilde{g}(t - \tau_i - nT_r) \tag{A.11}$$

In many cases, the pulse duration is a small fraction of the doppler period $1/f_d$. Thus, over a pulse duration, $\exp(j\omega_d[t-\tau_i])$ is nearly a constant whose value at the n-th pulse is obtained by setting t to $\tau_i + nT_r$, so $$\exp(j\omega_d[t-\tau_i])_{t=\tau_i+nT_r} = \exp(j\omega_d n T_r) \tag{A.12}$$

Thus, we may write (A.11) as $$\tilde{g}_1(t) = \sum_{n=0}^{N-1} \tilde{g}(t - \tau_i - nT_r) e^{j\omega_d n T_r} \tag{A.13}$$

However, in our case, the pulse duration may be a significant fraction of the doppler period $1/f_d$, and we can no longer consider $\exp(j\omega_d[t-\tau_i])$ to be nearly a constant. Then there will be significant doppler phase shift during the pulse duration. To make this evident, let us set $$t = t' + \tau_i + nT_r \tag{A.14}$$

t' is the time along the duration of each pulse; i.e., along the range dimension, measured from the leading edge of the n-th received pulse. With this change (A.13) becomes $$\tilde{g}_1(t) = e^{j\omega_d t'} \sum_{n=0}^{N-1} \tilde{g}(t') e^{jn\omega_d T_r} \tag{A.15}$$

$$= e^{j\omega_d t'} \tilde{g}(t') \sum_{n=0}^{N-1} e^{jn\omega_d T_r}$$

(A.15) shows that the echo complex envelope consists of the product of two parts:
1. A part $e^{j\omega_d t'} \tilde{g}(t')$ characterizing variation along a range trace.
2. A part $$\sum_{n=0}^{N-1} e^{jn\omega_d T_r}$$

characterizing pulse to pulse variation. Any signal processing to be performed can therefore be divided into a per pulse operation (i.e., along a range trace) and a pulse to pulse operation. It is clear that these may be done in either order.

A.2 The Pulse to Pulse Operation (A.15) expresses a sequence of quantities $y_n$ such that $$y_n = e^{j\omega_d t'} \tilde{g}(t') e^{jn\omega_d T_r}, \quad n = 0, 1, \ldots, N-1 \tag{A.16}$$

Figure 17:
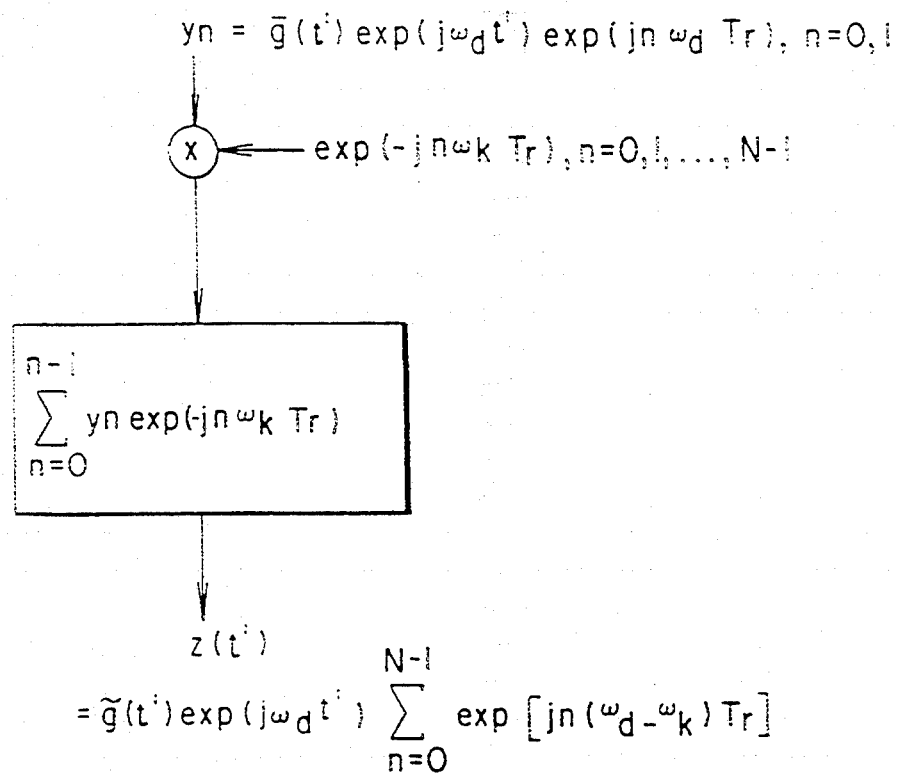
FIG. 17 is a mathematical description of the pulse-to-pulse Doppler filtering operation.

The pulse to pulse operation is a doppler filtering as ordinarily considered. It is illustrated in FIG. 17. the symbols are explained in the Glossary of Symbols at the start of this Appendix. The sequence of complex envelopes $y_n$, given by (A.16), is multiplied by a sequence of complex exponentials. The output, labeled z(t'), is given by $$z(t') = \tilde{g}(t') \exp(j\omega_d t') \sum_{n=0}^{N-1} \exp[jn(\omega_d - \omega_k)T_r] \tag{A.17}$$

Note that the summation in z(t') is simply a constant as far as t' is concerned. t' is the time along the range dimension and in the digital processing version $t' = r\tau_o$, where $\tau_o$ is the range sampling period.

Figure 18:
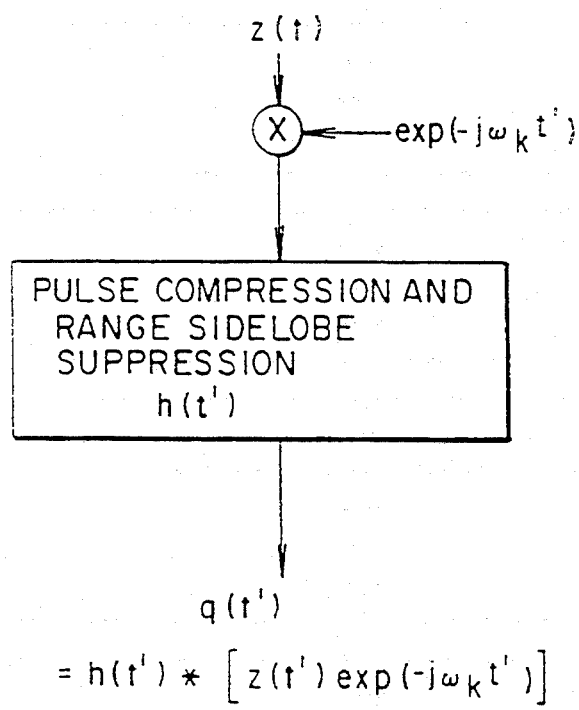
FIG. 18 is a mathematical description of the pulse compression and range sidelobe suppression following Doppler filtering.

The next step is to mix z(t') with an exponential wave having the frequency $2\pi f_k = \omega_k$ and to follow this mixing operation by the filtering operation, along the range dimension t', that performs pulse compression and range sidelobe suppression. This is illustrated in FIG. 18. FIG. 18 shows pulse compression and range sidelobe suppression (if present) following the doppler filter bank. h(t') is the impulse response of the cascaded pulse compression filter and sidelobe suppression filter (if present). The centered asterisk denotes convolution. The result of the convolution indicated in FIG. 18 is $$q(t') = [h(t') * g(t') e^{j(\omega_d - \omega_k)t'}] \quad (A.18)$$

$$\sum_{n=0}^{n-1} \exp[jn(\omega_d - \omega_k)T_r]$$

A.3 Interchange of the Operations

Figure 19:
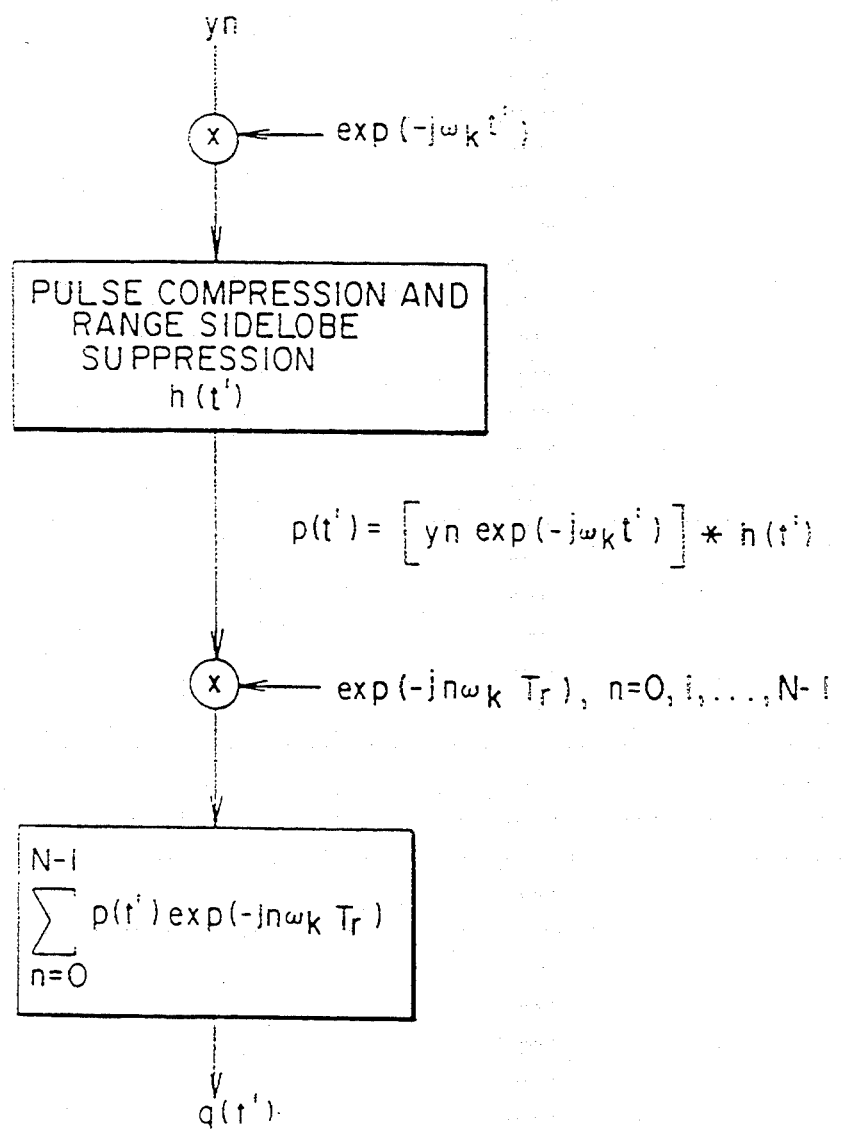
FIG. 19 illustrates the interchange of pulse compression and range sidelobe suppression with pulse-to-pulse Doppler filtering.

Now we look at an interchange of the operations illustrated in FIGS. 17 and 18. This interchange is shown in FIG. 19. The operation of pulse compression and range sidelobe suppression precedes the pulse to pulse doppler filtering, reversing the cascade operation of FIGS. 17 and 18. Using (A.16) for $y_n$, the output of the first filter can be written as $$\begin{aligned}p(t') &= [y_n \exp(-j\omega_k t')] \quad (A.19) \\ &= [\{\bar{g}(t') \exp[j(\omega_d - \omega_k)t']\} * h(t')] \\ &\quad \exp(jn\omega_d T_r), n = 0, 1, \ldots, n-1\end{aligned}$$

The second operation is the pulse to pulse mixing and filtering yielding $$\sum_{n=0}^{n-1} p(t') \exp(-jn\omega_k t_r) = [\{g(t') \exp[j(\omega_d - \omega_k)t']\} * h(t')] \quad (A.20)$$

$$\sum_{n=0}^{N-1} \exp[jn(\omega_d - \omega_k)T_r]$$

This is q(t') of (A.18).

This establishes the equivalence of FIG. 19 with the cascade of FIG. 17 and 18 and, therefore, the equivalence of FIGS. 3 and 4 when we set $t' = r\tau_0$, where $\tau_0$ is the range sampling period and r is an integer index.

What is claimed is:

1. A method for detecting anomalies, comprising the steps of:
   transmitting toward an anomaly a plurality of pulse sets, each consisting of a predetermined plurality of pulses, said pulses of said sets being dispersed in time pursuant to predetermined phase codes, said pulses of said sets being, in combination, selected mutually complementary in a manner such that, after pulse compression and summation of said pulses, range sidelobes cancel and main range lobes add;
   receiving echoes of said pulses reflected from said anomaly to produce received range signals extending over a spectrum spaced about a plurality of predetermined frequencies, which predetermined frequencies represent various target velocities, said received signals being encoded with one of said phase codes;
   at each of said predetermined frequencies, matched filtering said received signals with one of said phase codes to produce compressed range pulses in which the main range lobes are of the same sense, and in which the range sidelobes cancel, and the spectrum of which includes significant energy at adjacent ones of said predetermined frequencies;
   summing said compressed range pulses to produce compressed range signals in which said range sidelobes are suppressed, and in which the spectrum includes significant energy at adjacent ones of said predetermined frequencies; and
   Doppler filtering said compressed range signal pulse sets into said plurality of predetermined frequencies to produce a sequence of range values at each of said predetermined frequencies, with reduced energy at said adjacent ones of said predetermined frequencies.

2. A method according to claim 1, wherein said transmitting steps each include the step of transmitting an electromagnetic pulse set.

3. A method according to claim 1, wherein said transmitting steps are time-sequential.

4. A method according to claim 1, wherein said step of matched-filtering includes the steps of:
   converting at least some components of said received range signals which are centered at said predetermined frequencies to a common frequency; and
   performing said step of pulse compression and summing said compressed range signals.

5. A method according to claim 1, further comprising, before said Doppler filtering step, the step of converting at least some of said plurality of frequency components to a common baseband frequency.

6. A method according to claim 1, wherein said transmitting steps are performed in time sequence, and said summing step includes the further step of delaying the earlier of said compressed range pulses.

7. A method according to claim 6, wherein each said delaying step comprises the step of delaying by the duration of one of said sequences.

8. A method according to claim 1, wherein said step of matched filtering includes the steps of:
   matched filtering a first one of said predetermined plurality of pulses; and
   matched filtering a succeeding one of said predetermined plurality of pulses following said step of matched filtering said first one of said predetermined plurality of pulses.

9. A radar apparatus for detecting targets, comprising:
   code generating means for generating first and other complementary code sequences, said complementary code sequences being selected so their autocorrelations have main lobes of the same polarity, and sidelobes which, when summed with the corresponding sidelobes of others of said complementary code sequences, tend to cancel;
   transmitting means coupled to said code generating means for transmitting electromagnetic pulses modulated by said complementary code sequences;
   receiving means for receiving echoes of said pulses reflected from a target, for producing a sequence of range values of received first and succeeding pulse sets, said received first pulse set being modulated by said first code sequence, and said received succeeding pulse sets being modulated by said other code sequences;
   matched filtering means coupled to said receiving means, for selectively matched filtering said code sequences to thereby produce compressed pulses, respectively;

summing means coupled to said matched filtering means for summing together said compressed pulses, whereby the main lobes of said compressed pulses add, and the sidelobes tend to cancel, thereby producing range-sidelobe suppressed range pulses; and Doppler filtering means including a plurality of Doppler channels, said Doppler filtering means being coupled to said summing means, for filtering said received range-sidelobe-suppressed range pulses into a plurality of frequency components, each associated with one of said Doppler channels, for producing in at least one of said Doppler channels, if the radial velocity of said target is appropriate, a sequence of range-sidelobe suppressed range values.

10. An apparatus according to claim 9, wherein said code generating means comprises means for generating complementary codes.

11. An apparatus according to claim 10 wherein said transmitting means comprises means for transmitting electromagnetic pulses phase-modulated by said complementary codes.

12. An apparatus according to claim 9, wherein said matched filtering means comprises single pole, multiple throw switch means coupled to each of said Doppler channels for selectively switching said sequence of range values including said first code sequence to a first path, and for selectively switching said sequences of range values including said succeeding code sequences to corresponding paths;

first code matched filter means matched to said first code sequence coupled to said first path; and succeeding code matched filter means matched to said succeeding code sequences coupled to said corresponding path.

13. An apparatus according to claim 12, wherein said switch means further comprises:

switch control means for controlling said switch means by switching said switch means at a time near the first pulse transmitted in response to said first and succeeding complementary code sequences.

14. An apparatus, comprising:

a code generator for generating complementary codes, said codes being selected so that their auto-correlation functions have main lobes of the same polarity, and so that their sidelobes tend to cancel;

a transmitter coupled to said code generator for transmitting signals modulated by said codes;

a receiver for receiving echoes of said signals reflected from an anomaly, for producing a sequence of range values of received signal sets, said received first signal set being modulated by said first code, and said received succeeding signal set being modulated by said succeeding codes;

a plurality of mixers and coupled oscillators for removing Doppler phase shift along the range dimension to which are coupled said received first code set and succeeding code sets;

a plurality of single pole, multiple throw switches coupling the said received code sets to a corresponding plurality of matched filters for matched filtering said code sets to produce a corresponding plurality of time compressed pulses;

a plurality of delay and summing means to align such time compressed pulses so that their main lobes add and so that their sidelobes tend to cancel;

a pulse-to-pulse Doppler filter bank including a plurality of pulse-to-pulse Doppler channels;

coupling means whereby each of the plurality of said time compressed, delayed and summed pulses is coupled to the corresponding channel of said pulse-to-pulse Doppler filter bank, said filter bank Doppler channels filtering signal sets into a like plurality of frequency components, each of said frequency components being associated with one of said Doppler channels, for producing, if the anomaly radial velocity is appropriate, a sequence of range values in at least one of said Doppler channels.

* * * * *